US012267266B2

(12) United States Patent
Yu et al.

(10) Patent No.: US 12,267,266 B2
(45) Date of Patent: Apr. 1, 2025

(54) COMMUNICATION METHOD AND APPARATUS

(71) Applicant: Huawei Technologies Co., Ltd., Shenzhen (CN)

(72) Inventors: Yawei Yu, Shenzhen (CN); Chaojun Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 442 days.

(21) Appl. No.: 17/560,971

(22) Filed: Dec. 23, 2021

(65) Prior Publication Data

US 2022/0116176 A1  Apr. 14, 2022

Related U.S. Application Data

(63) Continuation of application No. PCT/CN2020/097068, filed on Jun. 19, 2020.

(30) Foreign Application Priority Data

Jun. 24, 2019 (CN) .......................... 201910550066.0

(51) Int. Cl.
*H04L 5/00* (2006.01)
(52) U.S. Cl.
CPC ................... *H04L 5/0048* (2013.01)
(58) Field of Classification Search
CPC ... H04L 5/0048; H04L 1/0003; H04L 1/0009; H04L 1/0016; H04L 5/0051;
(Continued)

(56) References Cited

U.S. PATENT DOCUMENTS 8,824,384 B2 * 9/2014 Nam ................... H04L 27/2613
370/329
11,206,639 B2 * 12/2021 Byun ..................... H04W 72/04
(Continued)

FOREIGN PATENT DOCUMENTS

CN        104125186 A     10/2014
CN        108632179 A     10/2018
(Continued)

OTHER PUBLICATIONS

Broadcom Corporation, "Adaptive UE Specific Reference Signal Design", 3GPP TSG RAN WG1 Meeting #72bis, R1-131321, Apr. 15-19, 2013, 4 pages, Chicago, USA.
(Continued)

*Primary Examiner* — Jay P Patel
(74) *Attorney, Agent, or Firm* — Slater Matsil, LLP

(57) ABSTRACT

An embodiment method includes: determining, by a terminal device, at least one parameter based on first MCS information after receiving the first MCS information, where the at least one parameter is used to indicate a first reference signal pattern, so that the terminal device sends an uplink reference signal based on the first reference signal pattern; and determining, by a network device, the at least one parameter based on the first MCS information, where the at least one parameter is used to indicate the first reference signal pattern, so that the network device receives the uplink reference signal based on the first reference signal pattern.

15 Claims, 8 Drawing Sheets

(58) Field of Classification Search
CPC ... H04L 5/0053; H04L 5/0094; H04L 1/0026; H04L 1/0034; H04W 72/23
See application file for complete search history.

(56) References Cited

U.S. PATENT DOCUMENTS

| | | | |
|---|---|---|---|
| 11,228,407 B2* | 1/2022 | Jeon | H04W 88/08 |
| 2014/0226541 A1 | 8/2014 | Xu et al. | |
| 2014/0241150 A1 | 8/2014 | Ng et al. | |
| 2014/0293881 A1 | 10/2014 | Khoshnevis et al. | |
| 2015/0282123 A1 | 10/2015 | Miao et al. | |
| 2015/0288483 A1* | 10/2015 | Sun | H04L 5/0048 370/329 |
| 2015/0373694 A1* | 12/2015 | You | H04L 5/0051 370/329 |
| 2018/0102821 A1* | 4/2018 | Manolakos | H04L 5/0048 |
| 2019/0090201 A1 | 3/2019 | Akkarakaran et al. | |
| 2019/0158319 A1* | 5/2019 | Cezanne | H04B 17/382 |
| 2019/0305911 A1* | 10/2019 | Sarkis | H04L 5/0057 |
| 2019/0349240 A1 | 11/2019 | Saito et al. | |
| 2019/0357224 A1* | 11/2019 | Li | H04L 5/0055 |
| 2020/0052861 A1* | 2/2020 | Li | H04L 1/0026 |
| 2020/0220693 A1* | 7/2020 | Babaei | H04L 1/1812 |
| 2020/0229157 A1* | 7/2020 | Rastegardoost | H04L 5/0098 |

FOREIGN PATENT DOCUMENTS

| | | |
|---|---|---|
| CN | 109151982 A | 1/2019 |
| EP | 3606219 A1 | 2/2020 |
| WO | 2014130082 A1 | 8/2014 |
| WO | 2018123441 A1 | 7/2018 |
| WO | 2018227209 A1 | 12/2018 |

OTHER PUBLICATIONS

3GPP TS 38.211 V15.5.0 (Mar. 2019), 3rd Generation Partnership Project; Technical Specification Group Radio Access Network; NR; Physical channels and modulation(Release 15), 96 pages.

ZTE, "R1-1707187 Considerations for LTE Downlink DMRS Overhead Reduction", 3GPP TSG RAN WG1 #89, May 19, 2017, total 5 pages.

3GPP TS 38.212 V15.5.0 (Mar. 2019), 3rd Generation Partnership Project; Technical Specification Group Radio Access Network; NR; Multiplexing and channel coding(Release 15), 101 pages.

Qualcomm Incorporated, "Considerations on Physical Layer aspects of NR V2X", 3GPP TSG RAN WG1 Meeting #97, R1-1907269, May 13-17, 2019, 15 pages, Reno, USA.

3GPP TS 38.214 V15.5.0 (Mar. 2019), 3rd Generation Partnership Project; Technical Specification Group Radio Access Network; NR; Physical layer procedures for data(Release 15), 103 pages.

Huawei et al, "DL DM-RS for data transmissions", 3GPP TSG RAN WG1 Meeting #87, R1-1611244, Nov. 14-18, 2016, 5 pages, Reno, USA.

ZTE, "Discussion on downlink DMRS design", 3GPP TSG RAN WG1 NR Ad-Hoc#2, R1-1710196, Jun. 27-30, 2017, 22 pages, Qingdao, P.R. China.

* cited by examiner

COMMUNICATION METHOD AND APPARATUS

CROSS-REFERENCE TO RELATED APPLICATIONS

This application is a continuation of International Application No. PCT/CN2020/097068, filed on Jun. 19, 2020, which claims priority to Chinese Patent Application No. 201910550066.0, filed on Jun. 24, 2019. The disclosures of the aforementioned applications are hereby incorporated by reference in their entireties.

TECHNICAL FIELD

This application relates to the communication field, and in particular, to a communication method and apparatus.

BACKGROUND

In a new radio access technology (NR) system, different demodulation reference signal patterns (DMRS Patterns) are configured for different wireless fading channels to ensure that a receive end can accurately estimate the wireless fading channels. The DMRS pattern includes a quantity of symbols for sending a DMRS and a position of a resource for sending the DMRS.

Currently, in the NR system, the DMRS pattern may be notified by using radio resource control (RRC) signaling. Uplink transmission is used as an example. After determining the DMRS pattern, a network device notifies a terminal device of related information of the DMRS pattern by using the RRC signaling. The terminal device configures and sends the DMRS based on the related information. However, an RRC connection establishment process further includes processes such as connection management, radio bearer control, and connection mobility. Consequently, time for a transmit end to receive the DMRS pattern is relatively long. Therefore, it is difficult to flexibly configure the DMRS pattern in a short time.

SUMMARY

This application provides a communication method and apparatus, to resolve a problem of how to flexibly configure a DMRS pattern.

To achieve the foregoing objective, the following technical solutions are used in this application.

According to a first aspect, this application provides a communication method. The method may be applied to a terminal device, or the method may be applied to a communication apparatus that can support the terminal device in implementing the method. For example, the communication apparatus includes a chip system. The method includes: determining at least one parameter based on first modulation and coding scheme (MCS) information after receiving signaling including the first MCS information, where the at least one parameter is used to indicate a first reference signal pattern; and sending an uplink reference signal based on the first reference signal pattern.

According to a second aspect, this application provides a communication method. The method may be applied to a network device, or the method may be applied to a communication apparatus that can support the network device in implementing the method. For example, the communication apparatus includes a chip system. The method includes: sending signaling including first MCS information to a terminal device; determining at least one parameter based on the first MCS information, where the at least one parameter is used to indicate a first reference signal pattern; and receiving an uplink reference signal based on the first reference signal pattern.

According to the communication method provided in this embodiment of this application, a parameter used to determine a DMRS pattern is (implicitly) indicated by using MCS information. Compared with a manner of notifying the parameter of the DMRS pattern by using RRC signaling, the method can more flexibly configure the related parameter of the DMRS pattern, adapt to a change of an actual channel, and reduce some bit overheads.

In a possible design, the at least one parameter includes a reference signal additional position. There is a first correspondence between the first MCS information and the reference signal additional position.

The first correspondence is predefined; the first correspondence is configured by using higher layer signaling; or the first correspondence is configured by using downlink control information.

Specifically, the higher layer signaling is used to configure the first correspondence, or the higher layer signaling is used to configure index information of the first correspondence; or the downlink control information is used to configure the first correspondence, or the downlink control information is used to configure the index information of the first correspondence.

Optionally, the first correspondence is one of a plurality of correspondences.

In another possible design, the at least one parameter includes a reference signal type. There is a second correspondence between the first MCS information and the reference signal type.

The second correspondence is predefined; the second correspondence is configured by using higher layer signaling; or the second correspondence is configured by using downlink control information.

Specifically, the higher layer signaling is used to configure the second correspondence, or the higher layer signaling is used to configure index information of the second correspondence; or the downlink control information is used to configure the second correspondence, or the downlink control information is used to configure the index information of the second correspondence.

Optionally, the second correspondence is one of a plurality of correspondences.

In another possible design, the at least one parameter includes a reference signal additional position and a reference signal type. There is a third correspondence among the first MCS information, the reference signal additional position, and the reference signal type.

The third correspondence is predefined; the third correspondence is configured by using higher layer signaling; or the third correspondence is configured by using downlink control information.

Specifically, the higher layer signaling is used to configure the third correspondence, or the higher layer signaling is used to configure index information of the third correspondence; or the downlink control information is used to configure the third correspondence, or the downlink control information is used to configure the index information of the third correspondence.

Optionally, the third correspondence is one of a plurality of correspondences.

According to a third aspect, this application provides a communication method. The method may be applied to a terminal device, or the method may be applied to a communication apparatus that can support the terminal device in implementing the method. For example, the communication apparatus includes a chip system. The method includes: determining at least one parameter based on first MCS information and reference signal sending period information after receiving signaling including the first MCS information, where the at least one parameter is used to indicate a first reference signal pattern; and sending an uplink reference signal based on the first reference signal pattern.

According to a fourth aspect, this application provides a communication method. The method may be applied to a network device, or the method may be applied to a communication apparatus that can support the network device in implementing the method. For example, the communication apparatus includes a chip system. The method includes: sending signaling including first MCS information to a terminal device; determining at least one parameter based on the first MCS information and reference signal sending period information, where the at least one parameter is used to indicate a first reference signal pattern; and receiving an uplink reference signal based on the first reference signal pattern.

According to the communication method provided in this embodiment of this application, a parameter used to determine a DMRS pattern is (implicitly) indicated by using MCS information and the reference signal sending period information. Compared with a manner of notifying the parameter of the DMRS pattern by using RRC signaling, the method can more flexibly configure the related parameter of the DMRS pattern, adapt to a change of an actual channel, and reduce some bit overheads.

In a possible design, the at least one parameter includes a reference signal additional position. There is a fourth correspondence among the first MCS information, the reference signal sending period information, and the reference signal additional position.

The fourth correspondence is predefined; the fourth correspondence is configured by using higher layer signaling; or the fourth correspondence is configured by using downlink control information.

Specifically, the higher layer signaling is used to configure the fourth correspondence, or the higher layer signaling is used to configure index information of the fourth correspondence; or the downlink control information is used to configure the fourth correspondence, or the downlink control information is used to configure the index information of the fourth correspondence.

Optionally, the fourth correspondence is one of a plurality of correspondences.

In another possible design, the at least one parameter includes a reference signal type. There is a fifth correspondence among the first MCS information, the reference signal sending period information, and the reference signal type.

The fifth correspondence is predefined; the fifth correspondence is configured by using higher layer signaling; or the fifth correspondence is configured by using downlink control information.

Specifically, the higher layer signaling is used to configure the fifth correspondence, or the higher layer signaling is used to configure index information of the fifth correspondence; or the downlink control information is used to configure the fifth correspondence, or the downlink control information is used to configure the index information of the fifth correspondence.

Optionally, the fifth correspondence is one of a plurality of correspondences.

In another possible design, the at least one parameter includes a reference signal additional position and a reference signal type. There is a sixth correspondence among the first MCS information, the reference signal sending period information, the reference signal additional position, and the reference signal type.

The sixth correspondence is predefined; the sixth correspondence is configured by using higher layer signaling; or the sixth correspondence is configured by using downlink control information.

Specifically, the higher layer signaling is used to configure the sixth correspondence, or the higher layer signaling is used to configure index information of the sixth correspondence; or the downlink control information is used to configure the sixth correspondence, or the downlink control information is used to configure the index information of the sixth correspondence.

Optionally, the sixth correspondence is one of a plurality of correspondences.

It should be noted that the signaling including the first MCS information may be downlink control information, the first MCS information is a first MCS index, and the uplink reference signal may be a DMRS.

According to a fifth aspect, this application provides a communication method. The method may be applied to a terminal device, or the method may be applied to a communication apparatus that can support the terminal device in implementing the method. For example, the communication apparatus includes a chip system. The method includes: determining at least one parameter based on second MCS information after receiving signaling including the second MCS information, where the at least one parameter is used to indicate a second reference signal pattern; and receiving a downlink reference signal based on the second reference signal pattern.

According to the communication method provided in this embodiment of this application, a parameter used to determine a DMRS pattern is (implicitly) indicated by using MCS information. Compared with a manner of notifying the parameter of the DMRS pattern by using RRC signaling, the method can more flexibly configure the related parameter of the DMRS pattern, adapt to a change of an actual channel, and reduce some bit overheads.

According to a sixth aspect, this application provides a communication method. The method may be applied to a network device, or the method may be applied to a communication apparatus that can support the network device in implementing the method. For example, the communication apparatus includes a chip system. The method includes: sending signaling including second MCS information to a terminal device; determining a second reference signal pattern; and sending a downlink reference signal based on the second reference signal pattern.

In a possible design, the at least one parameter includes a reference signal additional position. There is a seventh correspondence between the second MCS information and the reference signal additional position.

The seventh correspondence is predefined; the seventh correspondence is configured by using higher layer signaling; or the seventh correspondence is configured by using downlink control information.

Specifically, the higher layer signaling is used to configure the seventh correspondence, or the higher layer signaling is used to configure index information of the seventh correspondence; or the downlink control information is used to configure the seventh correspondence, or the downlink control information is used to configure the index information of the seventh correspondence.

Optionally, the seventh correspondence is one of a plurality of correspondences.

In another possible design, the at least one parameter includes a reference signal type. There is an eighth correspondence between the second MCS information and the reference signal type.

The eighth correspondence is predefined; the eighth correspondence is configured by using higher layer signaling; or the eighth correspondence is configured by using downlink control information.

Specifically, the higher layer signaling is used to configure the eighth correspondence, or the higher layer signaling is used to configure index information of the eighth correspondence; or the downlink control information is used to configure the eighth correspondence, or the downlink control information is used to configure the index information of the eighth correspondence.

Optionally, the eighth correspondence is one of a plurality of correspondences.

In another possible design, the at least one parameter includes a reference signal additional position and a reference signal type. There is a ninth correspondence among the second MCS information, the reference signal type, and the reference signal type.

The ninth correspondence is predefined; the ninth correspondence is configured by using higher layer signaling; or the ninth correspondence is configured by using downlink control information.

Specifically, the higher layer signaling is used to configure the ninth correspondence, or the higher layer signaling is used to configure index information of the ninth correspondence; or the downlink control information is used to configure the ninth correspondence, or the downlink control information is used to configure the index information of the ninth correspondence.

Optionally, the ninth correspondence is one of a plurality of correspondences.

According to a seventh aspect, this application provides a communication method. The method may be applied to a terminal device, or the method may be applied to a communication apparatus that can support the terminal device in implementing the method. For example, the communication apparatus includes a chip system. The method includes: determining at least one parameter based on second MCS information and reference signal sending period information after receiving signaling including the second MCS information, where the at least one parameter is used to indicate a second reference signal pattern; and receiving a downlink reference signal based on the second reference signal pattern.

According to the communication method provided in this embodiment of this application, a parameter used to determine a DMRS pattern is (implicitly) indicated by using MCS information and the reference signal sending period information. Compared with a manner of notifying the parameter of the DMRS pattern by using RRC signaling, the method can more flexibly configure the related parameter of the DMRS pattern, adapt to a change of an actual channel, and reduce some bit overheads.

According to an eighth aspect, this application provides a communication method. The method may be applied to a network device, or the method may be applied to a communication apparatus that can support the network device in implementing the method. For example, the communication apparatus includes a chip system. The method includes: sending signaling including second MCS information to a terminal device; determining a second reference signal pattern; and sending a downlink reference signal based on the second reference signal pattern.

In a possible design, the at least one parameter includes a reference signal additional position. There is a tenth correspondence among the second MCS information, the reference signal sending period information, and the reference signal additional position.

The tenth correspondence is predefined; the tenth correspondence is configured by using higher layer signaling; or the tenth correspondence is configured by using downlink control information.

Specifically, the higher layer signaling is used to configure the tenth correspondence, or the higher layer signaling is used to configure index information of the tenth correspondence; or the downlink control information is used to configure the tenth correspondence, or the downlink control information is used to configure the index information of the tenth correspondence.

Optionally, the tenth correspondence is one of a plurality of correspondences.

In another possible design, the at least one parameter includes a reference signal type. There is an eleventh correspondence among the second MCS information, the reference signal sending period information, and the reference signal type.

The eleventh correspondence is predefined; the eleventh correspondence is configured by using higher layer signaling; or the eleventh correspondence is configured by using downlink control information.

Specifically, the higher layer signaling is used to configure the eleventh correspondence, or the higher layer signaling is used to configure index information of the eleventh correspondence; or the downlink control information is used to configure the eleventh correspondence, or the downlink control information is used to configure the index information of the eleventh correspondence.

Optionally, the eleventh correspondence is one of a plurality of correspondences.

In another possible design, the at least one parameter includes a reference signal additional position and a reference signal type. There is a twelfth correspondence among the first MCS information, the reference signal sending period information, the reference signal type, and the reference signal type.

The twelfth correspondence is predefined; the twelfth correspondence is configured by using higher layer signaling; or the twelfth correspondence is configured by using downlink control information.

Specifically, the higher layer signaling is used to configure the twelfth correspondence, or the higher layer signaling is used to configure index information of the twelfth correspondence; or the downlink control information is used to configure the twelfth correspondence, or the downlink control information is used to configure the index information of the twelfth correspondence.

Optionally, the twelfth correspondence is one of a plurality of correspondences.

It should be noted that the second signaling is downlink control information, the second MCS information is a second MCS index, and the downlink reference signal may be a DMRS.

According to a ninth aspect, this application provides a communication method. The method may be applied to a terminal device, or the method may be applied to a communication apparatus that can support the terminal device in implementing the method. For example, the communication apparatus includes a chip system. The method includes: sending first signaling after determining a first channel quality indication (CQI), where the first signaling includes the first CQI; determining at least one parameter based on the first CQI, where the at least one parameter is used to indicate a first reference signal pattern; and sending an uplink reference signal based on the first reference signal pattern.

According to a tenth aspect, this application provides a communication method. The method may be applied to a network device, or the method may be applied to a communication apparatus that can support the network device in implementing the method. For example, the communication apparatus includes a chip system. The method includes: determining at least one parameter based on a first CQI after receiving first signaling including the first CQI, where the at least one parameter is used to indicate a first reference signal pattern; and receiving an uplink reference signal based on the first reference signal pattern.

According to the communication method provided in this embodiment of this application, a parameter used to determine a DMRS pattern is (implicitly) indicated by using a CQI. Compared with a manner of notifying the parameter of the DMRS pattern by using RRC signaling, the method can more flexibly configure the related parameter of the DMRS pattern, adapt to a change of an actual channel, and reduce some bit overheads.

In a possible design, the at least one parameter includes a reference signal additional position. There is a thirteenth correspondence between the first CQI and the reference signal additional position.

The thirteenth correspondence is predefined; the thirteenth correspondence is configured by using higher layer signaling; or the thirteenth correspondence is configured by using downlink control information.

Specifically, the higher layer signaling is used to configure the thirteenth correspondence, or the higher layer signaling is used to configure index information of the thirteenth correspondence; or the downlink control information is used to configure the thirteenth correspondence, or the downlink control information is used to configure the index information of the thirteenth correspondence.

Optionally, the thirteenth correspondence is one of a plurality of correspondences.

In another possible design, the at least one parameter includes a reference signal type. There is a fourteenth correspondence between the first CQI and the reference signal type.

The fourteenth correspondence is predefined; the fourteenth correspondence is configured by using higher layer signaling; or the fourteenth correspondence is configured by using downlink control information.

Specifically, the higher layer signaling is used to configure the fourteenth correspondence, or the higher layer signaling is used to configure index information of the fourteenth correspondence; or the downlink control information is used to configure the fourteenth correspondence, or the downlink control information is used to configure the index information of the fourteenth correspondence.

Optionally, the fourteenth correspondence is one of a plurality of correspondences.

In another possible design, the at least one parameter includes a reference signal additional position and a reference signal type. There is a fifteenth correspondence among the first CQI, the reference signal additional position, and the reference signal type.

The fifteenth correspondence is predefined; the fifteenth correspondence is configured by using higher layer signaling; or the fifteenth correspondence is configured by using downlink control information.

Specifically, the higher layer signaling is used to configure the fifteenth correspondence, or the higher layer signaling is used to configure index information of the fifteenth correspondence; or the downlink control information is used to configure the fifteenth correspondence, or the downlink control information is used to configure the index information of the fifteenth correspondence.

Optionally, the fifteenth correspondence is one of a plurality of correspondences.

It should be noted that the first CQI is channel quality measured by the terminal device for an uplink transmission channel (for example, a PUSCH).

According to an eleventh aspect, this application provides a communication method. The method may be applied to a terminal device, or the method may be applied to a communication apparatus that can support the terminal device in implementing the method. For example, the communication apparatus includes a chip system. The method includes: sending second signaling after determining a second CQI, where the second signaling includes the second CQI; determining at least one parameter based on the second CQI, where the at least one parameter is used to indicate a second reference signal pattern; and receiving a downlink reference signal based on the second reference signal pattern.

According to the communication method provided in this embodiment of this application, a parameter used to determine a DMRS pattern is (implicitly) indicated by using a CQI. Compared with a manner of notifying the parameter of the DMRS pattern by using RRC signaling, the method can more flexibly configure the related parameter of the DMRS pattern, adapt to a change of an actual channel, and reduce some bit overheads.

According to a twelfth aspect, this application provides a communication method. The method may be applied to a network device, or the method may be applied to a communication apparatus that can support the network device in implementing the method. For example, the communication apparatus includes a chip system. The method includes: determining at least one parameter based on a second CQI after receiving second signaling including the second CQI, where the at least one parameter is used to indicate a second reference signal pattern; and sending a downlink reference signal based on the second reference signal pattern.

In a possible design, the at least one parameter includes a reference signal additional position. There is a sixteenth correspondence between the second CQI and the reference signal additional position.

The sixteenth correspondence is predefined; the sixteenth correspondence is configured by using higher layer signaling; or the sixteenth correspondence is configured by using downlink control information.

Specifically, the higher layer signaling is used to configure the sixteenth correspondence, or the higher layer signaling is used to configure index information of the sixteenth correspondence; or the downlink control information is used to configure the sixteenth correspondence, or the downlink control information is used to configure the index information of the sixteenth correspondence.

Optionally, the twelfth correspondence is one of a plurality of correspondences.

In another possible design, the at least one parameter includes a reference signal type. There is a seventeenth correspondence between the second CQI and the reference signal type.

The seventeenth correspondence is predefined; the seventeenth correspondence is configured by using higher layer signaling; or the seventeenth correspondence is configured by using downlink control information.

Specifically, the higher layer signaling is used to configure the seventeenth correspondence, or the higher layer signaling is used to configure index information of the seventeenth correspondence; or the downlink control information is used to configure the seventeenth correspondence, or the downlink control information is used to configure the index information of the seventeenth correspondence.

Optionally, the seventeenth correspondence is one of a plurality of correspondences.

In another possible design, the at least one parameter includes a reference signal additional position and a reference signal type. There is an eighteenth correspondence among the first CQI, the reference signal type, and the reference signal type.

The eighteenth correspondence is predefined; the eighteenth correspondence is configured by using higher layer signaling; or the eighteenth correspondence is configured by using downlink control information.

Specifically, the higher layer signaling is used to configure the eighteenth correspondence, or the higher layer signaling is used to configure index information of the eighteenth correspondence; or the downlink control information is used to configure the eighteenth correspondence, or the downlink control information is used to configure the index information of the eighteenth correspondence.

Optionally, the eighteenth correspondence is one of a plurality of correspondences.

It should be noted that the second CQI is channel quality measured by the terminal device for a downlink transmission channel (for example, a PDSCH).

According to a thirteenth aspect, this application further provides a communication apparatus, configured to implement the method described in the first aspect. The communication apparatus is a terminal device or a communication apparatus that supports the terminal device in implementing the method described in the first aspect. For example, the communication apparatus includes a chip system. For example, the communication apparatus includes a receiving unit, a processing unit, and a sending unit. The receiving unit is configured to receive first signaling, where the first signaling includes first MCS information. The processing unit is configured to determine at least one parameter based on the first MCS information received by the receiving unit, where the at least one parameter is used to indicate a first reference signal pattern. The sending unit is configured to send an uplink reference signal based on the first reference signal pattern.

According to a fourteenth aspect, this application further provides a communication apparatus, configured to implement the method described in the second aspect. The communication apparatus is a network device or a communication apparatus that supports the network device in implementing the method described in the second aspect. For example, the communication apparatus includes a chip system. For example, the communication apparatus includes a receiving unit, a processing unit, and a sending unit. The sending unit is configured to send first signaling, where the first signaling includes first MCS information. The processing unit is configured to determine at least one parameter based on the first MCS information, where the at least one parameter is used to indicate a first reference signal pattern. The receiving unit is configured to receive an uplink reference signal based on the first reference signal pattern.

The communication apparatus provided in this embodiment of this application implicitly indicates a parameter of a DMRS pattern by using MCS information. Compared with a manner of notifying the parameter of the DMRS pattern by using RRC signaling, this manner can flexibly configure the related parameter of the DMRS pattern in real time, adapt to a change of an actual channel, and reduce some bit overheads.

According to a fifteenth aspect, this application further provides a communication apparatus, configured to implement the method described in the third aspect. The communication apparatus is a terminal device or a communication apparatus that supports the terminal device in implementing the method described in the third aspect. For example, the communication apparatus includes a chip system. For example, the communication apparatus includes a receiving unit, a processing unit, and a sending unit. The receiving unit is configured to receive first signaling, where the first signaling includes first MCS information. The processing unit is configured to determine at least one parameter based on the first MCS information received by the receiving unit and reference signal sending period information, where the at least one parameter is used to indicate a first reference signal pattern. The sending unit is configured to send an uplink reference signal based on the first reference signal pattern.

According to a sixteenth aspect, this application further provides a communication apparatus, configured to implement the method described in the fourth aspect. The communication apparatus is a network device or a communication apparatus that supports the network device in implementing the method described in the fourth aspect. For example, the communication apparatus includes a chip system. For example, the communication apparatus includes a receiving unit, a processing unit, and a sending unit. The sending unit is configured to send first signaling, where the first signaling includes first MCS information. The processing unit is configured to determine at least one parameter based on the first MCS information and reference signal sending period information, where the at least one parameter is used to indicate a first reference signal pattern. The receiving unit is configured to receive an uplink reference signal based on the first reference signal pattern.

The communication apparatus provided in this embodiment of this application implicitly indicates a parameter of a DMRS pattern by using MCS information and the reference signal sending period information. Compared with a manner of notifying the parameter of the DMRS pattern by using RRC signaling, this manner can flexibly configure the related parameter of the DMRS pattern in real time, adapt to a change of an actual channel, and reduce some bit overheads.

According to a seventeenth aspect, this application further provides a communication apparatus, configured to implement the method described in the fifth aspect. The communication apparatus is a terminal device or a communication apparatus that supports the terminal device in implementing the method described in the fifth aspect. For example, the communication apparatus includes a chip system. For example, the communication apparatus includes a receiving unit, a processing unit, and a sending unit. The receiving unit is configured to receive second signaling, where the second signaling includes second MCS information. The processing unit is configured to determine at least one parameter based on the second MCS information received by the receiving unit, where the at least one parameter is used to indicate a second reference signal pattern. The receiving unit is further configured to receive a downlink reference signal based on the second reference signal pattern.

The communication apparatus provided in this embodiment of this application implicitly indicates a parameter of a DMRS pattern by using MCS information. Compared with a manner of notifying the parameter of the DMRS pattern by using RRC signaling, this manner can flexibly configure the related parameter of the DMRS pattern in real time, adapt to a change of an actual channel, and reduce some bit overheads.

According to an eighteenth aspect, this application further provides a communication apparatus, configured to implement the method described in the sixth aspect. The communication apparatus is a network device or a communication apparatus that supports the network device in implementing the method described in the sixth aspect. For example, the communication apparatus includes a chip system. For example, the communication apparatus includes a receiving unit, a processing unit, and a sending unit. The sending unit is configured to send signaling including second MCS information to a terminal device. The processing unit is configured to determine a second reference signal pattern. The sending unit is further configured to send a downlink reference signal based on the second reference signal pattern.

According to a nineteenth aspect, this application further provides a communication apparatus, configured to implement the method described in the seventh aspect. The communication apparatus is a terminal device or a communication apparatus that supports the terminal device in implementing the method described in the seventh aspect. For example, the communication apparatus includes a chip system. For example, the communication apparatus includes a receiving unit, a processing unit, and a sending unit. The receiving unit is configured to receive second signaling, where the second signaling includes second MCS information. The processing unit is configured to determine at least one parameter based on the second MCS information received by the receiving unit and reference signal sending period information, where the at least one parameter is used to indicate a second reference signal pattern. The receiving unit is further configured to receive a downlink reference signal based on the second reference signal pattern.

The communication apparatus provided in this embodiment of this application implicitly indicates a parameter of a DMRS pattern by using MCS information and the reference signal sending period information. Compared with a manner of notifying the parameter of the DMRS pattern by using RRC signaling, this manner can flexibly configure the related parameter of the DMRS pattern in real time, adapt to a change of an actual channel, and reduce some bit overheads.

According to a twentieth aspect, this application further provides a communication apparatus, configured to implement the method described in the eighth aspect. The communication apparatus is a network device or a communication apparatus that supports the network device in implementing the method described in the eighth aspect. For example, the communication apparatus includes a chip system. For example, the communication apparatus includes a receiving unit, a processing unit, and a sending unit. The sending unit is configured to send signaling including second MCS information to a terminal device. The processing unit is configured to determine a second reference signal pattern. The sending unit is configured to send a downlink reference signal based on the second reference signal pattern.

According to a twenty-first aspect, this application further provides a communication apparatus, configured to implement the method described in the ninth aspect. The communication apparatus is a terminal device or a communication apparatus that supports the terminal device in implementing the method described in the ninth aspect. For example, the communication apparatus includes a chip system. For example, the communication apparatus includes a processing unit and a sending unit. The sending unit is configured to send first signaling, where the first signaling includes a first CQI. The processing unit is configured to determine the first CQI, and determine at least one parameter based on the first CQI received by the receiving unit, where the at least one parameter is used to indicate a first reference signal pattern. The sending unit is configured to send an uplink reference signal based on the first reference signal pattern.

According to a twenty-second aspect, this application further provides a communication apparatus, configured to implement the method described in the tenth aspect. The communication apparatus is a network device or a communication apparatus that supports the network device in implementing the method described in the tenth aspect. For example, the communication apparatus includes a chip system. For example, the communication apparatus includes a receiving unit, a processing unit, and a sending unit. The receiving unit is configured to receive first signaling, where the first signaling includes a first CQI. The processing unit is configured to determine at least one parameter based on the first CQI, where the at least one parameter is used to indicate a first reference signal pattern. The receiving unit is configured to receive an uplink reference signal based on the first reference signal pattern.

The communication apparatus provided in this embodiment of this application implicitly indicates a parameter of a DMRS pattern by using a CQI. Compared with a manner of notifying the parameter of the DMRS pattern by using RRC signaling, this manner can flexibly configure the related parameter of the DMRS pattern in real time, adapt to a change of an actual channel, and reduce some bit overheads.

According to a twenty-third aspect, this application further provides a communication apparatus, configured to implement the method described in the eleventh aspect. The communication apparatus is a terminal device or a communication apparatus that supports the terminal device in implementing the method described in the eleventh aspect. For example, the communication apparatus includes a chip system. For example, the communication apparatus includes a receiving unit, a processing unit, and a sending unit. The processing unit is configured to determine a second CQI, and determine at least one parameter based on the second CQI received by the receiving unit, where the at least one parameter is used to indicate a second reference signal pattern. The receiving unit is further configured to receive a downlink reference signal based on the second reference signal pattern. The sending unit is configured to send second signaling, where the second signaling includes the second CQI.

The communication apparatus provided in this embodiment of this application implicitly indicates a parameter of a DMRS pattern by using a CQI. Compared with a manner of notifying the parameter of the DMRS pattern by using RRC signaling, this manner can flexibly configure the related parameter of the DMRS pattern in real time, adapt to a change of an actual channel, and reduce some bit overheads.

According to a twenty-fourth aspect, this application further provides a communication apparatus, configured to implement the method described in the twelfth aspect. The communication apparatus is a network device or a communication apparatus that supports the network device in implementing the method described in the twelfth aspect. For example, the communication apparatus includes a chip system. For example, the communication apparatus includes a receiving unit, a processing unit, and a sending unit. The receiving unit is configured to receive second signaling including a second CQI. The processing unit is configured to determine at least one parameter based on the second CQI, where the at least one parameter is used to indicate a second reference signal pattern. The sending unit is configured to send a downlink reference signal based on the second reference signal pattern.

It should be noted that the function modules in the thirteenth aspect to the twenty-fourth aspect may be implemented by hardware, or may be implemented by hardware executing corresponding software. The hardware or the software includes one or more modules corresponding to the foregoing functions. For example, a transceiver is configured to complete functions of the receiving unit and the sending unit, a processor is configured to complete a function of the processing unit, and a memory is configured to store program instructions used by the processor to perform the methods in this application. The processor, the transceiver, and the memory are connected and implement mutual communication by using a bus. Specifically, refer to a function of behavior of the terminal device or the network device in the methods according to the first aspect to the twelfth aspect.

According to a twenty-fifth aspect, this application further provides a communication apparatus, configured to implement the methods described in the first aspect to the twelfth aspect. The communication apparatus is a terminal device or a communication apparatus that supports the terminal device in implementing the methods described in the first aspect, the third aspect, the fifth aspect, the seventh aspect, the ninth aspect, and the eleventh aspect. For example, the communication apparatus includes a chip system. Alternatively, the communication apparatus is a network device or a communication apparatus that supports the network device in implementing the methods described in the second aspect, the fourth aspect, the sixth aspect, the eighth aspect, the tenth aspect, and the twelfth aspect. For example, the communication apparatus includes a chip system. For example, the communication apparatus includes a processor, configured to implement the functions in the methods described in the foregoing related aspects. The communication apparatus may further include a memory, configured to store program instructions and data. The memory is coupled to the processor, and the processor may invoke and execute the program instructions stored in the memory, to implement the functions in the methods described in the foregoing related aspects. The communication apparatus may further include a communication interface, and the communication interface is used by the communication apparatus to communicate with another device. For example, if the communication apparatus is a network device, the another device is a terminal device. If the communication apparatus is a terminal device, the another device is a network device.

For a specific method for determining at least one parameter, refer to corresponding description in the foregoing aspects. Details are not described herein again.

According to a twenty-sixth aspect, this application further provides a computer-readable storage medium, including computer software instructions. When the computer software instructions are run in a communication apparatus, the communication apparatus is enabled to perform the methods according to the foregoing related aspects.

According to a twenty-seventh aspect, this application further provides a computer program product including instructions. When the computer program product runs in a communication apparatus, the communication apparatus is enabled to perform the methods according to the foregoing related aspects.

According to a twenty-eighth aspect, this application provides a chip system. The chip system includes a processor, and may further include a memory, to implement the function of the network device or the terminal device in the foregoing methods. The chip system may include a chip, or may include a chip and another discrete component.

According to a twenty-ninth aspect, this application provides an apparatus. The apparatus includes at least one processor and an interface circuit. The interface circuit is configured to obtain a program or instructions. The at least one processor is configured to execute the program or execute to implement the methods described in the first aspect, the third aspect, the fifth aspect, the seventh aspect, the ninth aspect, and the eleventh aspect. The apparatus may be integrated into a terminal device, or may be independently implemented. Further, the apparatus may be an integrated circuit, and the integrated circuit may be an ASIC or an FPGA. The integrated circuit further includes a circuit element such as a resistor.

According to a thirtieth aspect, this application provides an apparatus. The apparatus includes at least one processor and an interface circuit. The interface circuit is configured to obtain a program or instructions. The at least one processor is configured to execute the program or execute to implement the methods described in the second aspect, the fourth aspect, the sixth aspect, the eighth aspect, the tenth aspect, and the twelfth aspect. The apparatus may be integrated into a network device, or may be independently implemented. Further, the apparatus may be an integrated circuit, and the integrated circuit may be an ASIC or an FPGA. The integrated circuit further includes a circuit element such as a resistor.

According to a thirty-first aspect, this application further provides a communication system. The communication system includes the terminal device or the communication apparatus that supports the terminal device in implementing the method described in the first aspect that is described in the thirteenth aspect and the network device or the communication apparatus that supports the network device in implementing the method described in the second aspect that is described in the fourteenth aspect.

Alternatively, the communication system includes the terminal device or the communication apparatus that supports the terminal device in implementing the method described in the third aspect that is described in the fifteenth aspect and the network device or the communication apparatus that supports the network device in implementing the method described in the fourth aspect that is described in the sixteenth aspect.

Alternatively, the communication system includes the terminal device or the communication apparatus that supports the terminal device in implementing the method described in the fifth aspect that is described in the seventeenth aspect and the network device or the communication apparatus that supports the network device in implementing the method described in the sixth aspect that is described in the eighteenth aspect.

Alternatively, the communication system includes the terminal device or the communication apparatus that supports the terminal device in implementing the method described in the seventh aspect that is described in the nineteenth aspect and the network device or the communication apparatus that supports the network device in implementing the method described in the eighth aspect that is described in the twentieth aspect.

Alternatively, the communication system includes the terminal device or the communication apparatus that supports the terminal device in implementing the method described in the ninth aspect that is described in the twenty-first aspect and the network device or the communication apparatus that supports the network device in implementing the method described in the tenth aspect that is described in the twenty-second aspect.

Alternatively, the communication system includes the terminal device or the communication apparatus that supports the terminal device in implementing the method described in the eleventh aspect that is described in the twenty-third aspect and the network device or the communication apparatus that supports the network device in implementing the method described in the twelfth aspect that is described in the twenty-fourth aspect.

Alternatively, the communication system includes the terminal device or the communication apparatus that supports the terminal device in implementing the method described in any one of the first aspect, the third aspect, the fifth aspect, the seventh aspect, the ninth aspect, and the eleventh aspect that is described in the thirtieth aspect and the network device or the communication apparatus that supports the network device in implementing the method described in any one of the second aspect, the fourth aspect, the sixth aspect, the eighth aspect, the tenth aspect, and the twelfth aspect that is described in the thirty-first aspect.

In addition, for technical effects brought by the design manners of any one of the foregoing aspects, refer to technical effects brought by different design manners of any one of the first aspect to the twelfth aspect. Details are not described herein again.

In this application, names of the terminal device, the network device, and the communication apparatus constitute no limitation on the device. During actual implementation, the devices may have other names, such devices fall within the scope of the claims of this application and their equivalent technologies, provided that functions of the devices are similar to those in this application.

DETAILED DESCRIPTION OF ILLUSTRATIVE EMBODIMENTS

Figure 1:
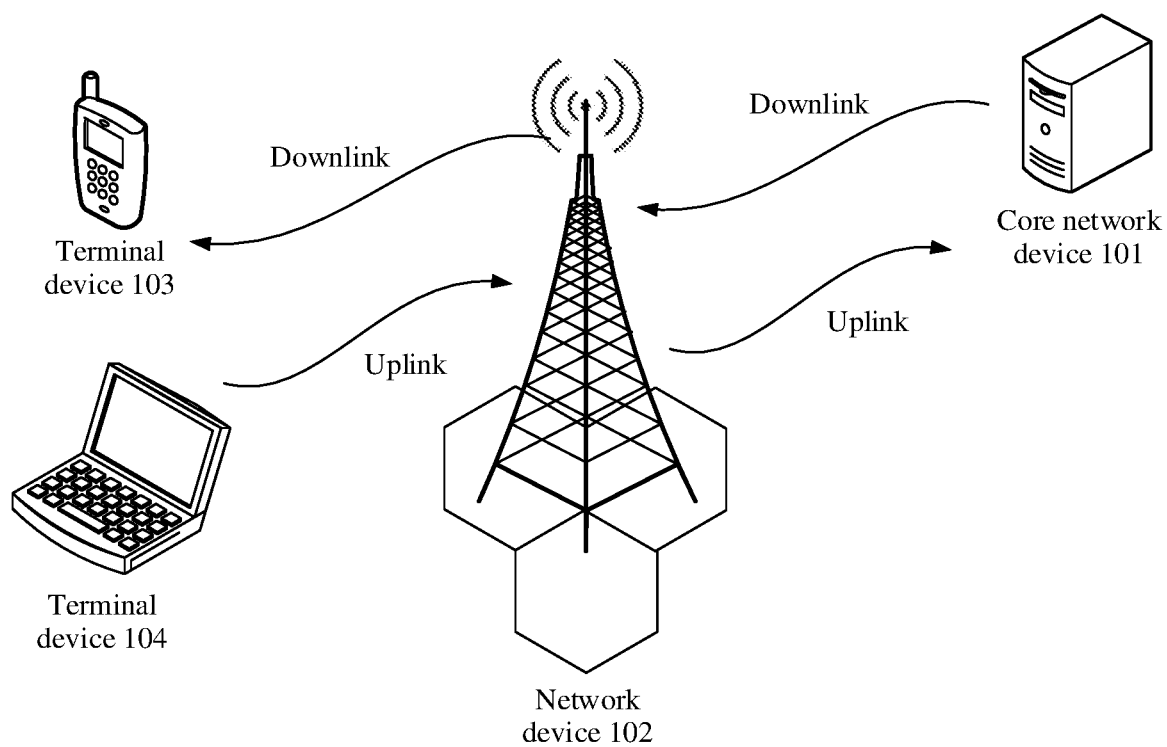
FIG. 1 is a simplified schematic diagram of an architecture of a communication system according to an embodiment of this application.

First, to make description of the following embodiments clear and concise, related technologies are briefly described.

In a wireless communication system, a transmit end may perform data transmission with a receive end by using a wireless fading channel. For example, for a downlink, the transmit end may be a network device, and the receive end may be a terminal device. The network device may carry downlink data on a physical downlink shared channel (PDSCH) to send the downlink data to the terminal device. For an uplink, the transmit end may be a terminal device, and the receive end may be a network device. The terminal device may carry uplink data on a physical uplink shared channel (PUSCH) to send the uplink data to the network device. To accurately and correctly demodulate data from a received signal, the receive end needs to accurately estimate the wireless fading channel first. For example, a reference signal used as a pilot is inserted into a time-frequency resource for data transmission, and the receive end estimates the wireless fading channel after receiving a reference signal that has undergone the wireless fading channel. In the following description, the reference signal may be a DMRS.

The time-frequency resource includes a time domain resource and/or a frequency domain resource. An NR system supports various time scheduling units, and a length of the time scheduling unit may be one or more time-domain symbols. The symbol is an orthogonal frequency division multiplexing (OFDM) symbol. The NR system includes slots, and one slot includes 14 symbols. The NR system supports a plurality of subcarrier spacings. When subcarrier spacings are different, time lengths corresponding to the slot are different. For example, when a subcarrier spacing is 15 kilohertz (kHz), a time length corresponding to a slot is 1 millisecond (ms). For example, when a subcarrier spacing is 30 kHz, a time length corresponding to a slot is 0.5 ms. For example, when a subcarrier spacing is 60 kHz, a time length corresponding to a slot is 0.25 ms. For example, when a subcarrier spacing is 120 kHz, a time length corresponding to a slot is 0.125 ms. Because a quantity of symbols in one slot is always 14, it may be understood that a time length corresponding to the symbol also varies with a subcarrier spacing. The frequency domain resource may be one or more resource blocks (RB), may be one or more resource elements (RE), may be one or more carriers/cells, may be one or more bandwidth parts (BWPs), may be one or more RBs in one or more BWPs on the one or more carriers, or may be one or more REs on the one or more RBs in the one or more BWPs on the one or more carriers. The time domain resource may be one or more slots, or may be one or more symbols in the one or more slots.

In the NR system, to ensure that the receive end can accurately estimate the wireless fading channel, different DMRS patterns are configured for different wireless fading channels. The DMRS pattern includes a quantity of symbols for sending a DMRS and a position of a resource for sending the DMRS. A design of a front-loaded DMRS and an additional DMRS is used for the DMRS pattern. Based on distribution of DMRSs in frequency domain and time domain, the DMRS pattern may be represented by using fields such as a DMRS type (dmrs-type), a front-loaded DMRS time domain length (maxLength), and a DMRS additional position (dmrs-additionalPosition). The DMRS type is used to indicate a pattern of the front-loaded DMRS in frequency domain. The front-loaded DMRS time domain length is used to indicate whether the front-loaded DMRS occupies one time-domain symbol or two consecutive time-domain symbols in time domain. The DMRS additional position is used to indicate a quantity of symbols occupied by the additional DMRS in time domain.

For example, a downlink is used as an example. RRC signaling includes a field "DL-DMRS-config-type", a field "DL-DMRS-max-len", and a field "DL-DMRS-add-pos". The field "DL-DMRS-config-type" is used to indicate a value of the DMRS type (dmrs-type). The field "DL-DMRS-max-len" is used to indicate a value of the front-loaded DMRS time domain length. The field "DL-DMRS-add-pos" is used to indicate a value of the DMRS additional position.

As shown in Table 1, configuration (configure) values of related fields of the DMRS pattern are defined.

TABLE 1

| Field | dmrs-type | maxLength | dmrs-additionalPosition |
|---|---|---|---|
| Config-uration value | type1 & type2 | single & double | When maxLength = double, values of dmrs-additionalPosition may be pos0 and pos1; when maxLength = single, values of dmrs-addionalPosition may be pos0, pos1, pos2, and pos3. |

When dmrs-type is configured as type1, each physical resource block (PRB) includes two code division multiplexing (CDM) groups in frequency domain. Six subcarriers of each CDM group can support transmission of two layers by using an orthogonal cover code (OCC). Therefore, four layers can be supported on a single symbol.

When dmrs-type is configured as type2, each PRB includes three CDM groups in frequency domain. Four subcarriers of each CDM group can support two layers by using the OCC. Therefore, a maximum of six layers can be supported on the single symbol.

When maxLength is configured as single, the front-loaded DMRS occupies only one symbol in time domain.

When maxLength is configured as double, the front-loaded DMRS occupies two consecutive symbols in time domain. Therefore, multiplexing of double terminal devices can be supported by using a time domain OCC between the two symbols. For example, when dmrs-type is configured as type1 and maxLength=2, transmission of a maximum of eight layers can be supported. When dmrs-type is configured as type2 and maxLength=2, transmission of a maximum of 12 layers can be supported.

When dmrs-additionalPosition is configured as pos0, the additional DMRS occupies no time-domain symbol.

When dmrs-additionalPosition is configured as pos1, the additional DMRS occupies one time-domain symbol (maxlength=single) or one time-domain symbol pair (maxlength=double).

When dmrs-additionalPosition is configured as pos2, the additional DMRS occupies two time-domain symbols.

When dmrs-additionalPosition is configured as pos3, the additional DMRS occupies three time-domain symbols.

Currently, in the NR system, the DMRS pattern may be notified by using the RRC signaling. Uplink transmission is used as an example. After determining the DMRS pattern, a network device notifies a terminal device of related information of the DMRS pattern by using the RRC signaling, and the terminal device may configure and send the DMRS based on the related information within each transmission time interval (TTI). However, an RRC connection establishment process further includes processes such as connection management, radio bearer control, and connection mobility. It takes a relatively long time (for example, hundreds of milliseconds) to transmit the RRC signaling from a higher layer to the terminal device. Consequently, it takes a relatively long time for the transmit end to receive an updated DMRS pattern. Therefore, it is difficult to flexibly configure the DMRS pattern in a short time.

To resolve the foregoing problem, this application provides a communication method. The method includes: A terminal device may determine at least one parameter based on first information after obtaining the first information, where the at least one parameter is used to indicate a first reference signal pattern, so that the terminal device sends an uplink reference signal based on the first reference signal pattern, or the terminal device receives a downlink reference signal based on the first reference signal pattern. For uplink transmission, a network device may determine the at least one parameter based on the first information after obtaining the first information, where the at least one parameter is used to indicate the first reference signal pattern, so that the network device receives the uplink reference signal based on the first reference signal pattern. The first information may be first MCS information, or the first information may include the first MCS information and RS sending period information. According to the communication method provided in this application, a parameter used to determine a DMRS pattern may be (implicitly) indicated by using MCS information or the MCS information and the RS sending period information. Compared with a manner of notifying the parameter of the DMRS pattern by using RRC signaling, the method can more flexibly configure the related parameter of the DMRS pattern, adapt to a change of an actual channel, and reduce some bit overheads.

In the specification, claims, and accompanying drawings of this application, the terms "first", "second", "third" and the like are intended to distinguish different objects but do not limit a particular sequence.

In the embodiments of this application, the word "example" or "for example" is used to represent giving an example, an illustration, or a description. Any embodiment or design solution described as an "example" or "for example" in the embodiments of this application should not be explained as being more preferred or having more advantages than another embodiment or design solution. Exactly, use of the word such as "example" or "for example" is intended to present a relative concept in a specific manner.

The following describes implementations of the embodiments of this application in detail with reference to accompanying drawings.

FIG. 1 is an example diagram of an architecture of a communication system to which an embodiment of this application may be applied. As shown in FIG. 1, the communication system includes a core network device 101, a network device 102, and at least one terminal device (a terminal device 103 and a terminal device 104 shown in FIG. 1). The terminal device is connected to the network device in a wireless manner, and the network device is connected to the core network device in a wireless or wired manner. The core network device and the network device may be different physical devices independent of each other, functions of the core network device and logical functions of the network device may be integrated into a same physical device, or a part of functions of the core network device and a part of functions of the network device may be integrated into one physical device. The terminal device may be at a fixed position or may be movable. FIG. 1 is merely a schematic diagram. The communication system may further include another network device, for example, a wireless relay device and a wireless backhaul device that are not shown in FIG. 1. Quantities of core network devices, network devices, and terminal devices included in the communication system are not limited in this embodiment of this application.

The terminal device may be a wireless terminal device that can receive scheduling and indication information of the network device. The wireless terminal device may be a device that provides a user with voice and/or data connectivity, a handheld device having a wireless connection function, or another processing device connected to a wireless modem. The wireless terminal device may communicate with one or more core networks or the internet through a radio access network (RAN). The wireless terminal device may be a mobile terminal device, such as a mobile phone (or referred to as a "cellular" phone and a mobile phone), a computer, and a data card, for example, may be a portable, pocket-sized, handheld, computer built-in, or in-vehicle mobile apparatus that exchanges language and/or data with the radio access network. For example, the device may include a personal communication service (PCS) phone, a cordless phone, a session initiation protocol (SIP) phone, a wireless local loop (WLL) station, a personal digital assistant (PDA), a tablet computer (Pad), and a computer having a wireless transceiving function. The wireless terminal device may also be referred to as a system, a subscriber unit, a mobile station (MS), a remote station, an access point (AP), a remote terminal, an access terminal, a user terminal, a user agent, a subscriber station (SS), customer premises equipment (CPE), a terminal, user equipment (UE), a mobile terminal (MT), or the like. Alternatively, the wireless terminal device may be a wearable device and a terminal device in a next-generation communication system such as a 5G network, a terminal device in a future evolved public land mobile network (public land mobile network, PLMN), a terminal device in an NR communication system, or the like.

The network device is an entity used to transmit or receive a signal on a network side, for example, a generation NodeB (gNodeB). The network device may be a device configured to communicate with a mobile device. The network device may be an AP in a wireless local area network (WLAN) or a base transceiver station (BTS) in global system for mobile communication (GSM) or code division multiple access (CDMA), may be a NodeB (NB) in wideband code division multiple access (WCDMA), or may be an evolved NodeB (eNB or eNodeB) in long term evolution (LTE), a relay station or an access point, a vehicle-mounted device, a wearable device, a network device in the future 5G network, a network device in the future evolved public land mobile network (PLMN), a gNodeB in the NR system, or the like. In addition, in this application, the network device serves a cell, and the terminal device communicates with the network device by using a transmission resource (for example, a frequency domain resource, namely, a spectrum resource) used by the cell. The cell may be a cell corresponding to the network device (for example, a base station). The cell may belong to a macro base station, or may belong to a base station corresponding to a small cell. The small cell herein may include a metro cell, a micro cell, a pico cell, a femto cell, and the like. The small cells have characteristics of small coverage and a low transmit power, and are applicable to providing a high-rate data transmission service. In addition, in another possible case, the network device may be another apparatus that provides a wireless communication function for the terminal device. A specific technology and a specific device form that are used by the network device are not limited in the embodiments of this application. For ease of description, in this application, an apparatus that provides the wireless communication function for the terminal device is referred to as the network device.

Figure 2:
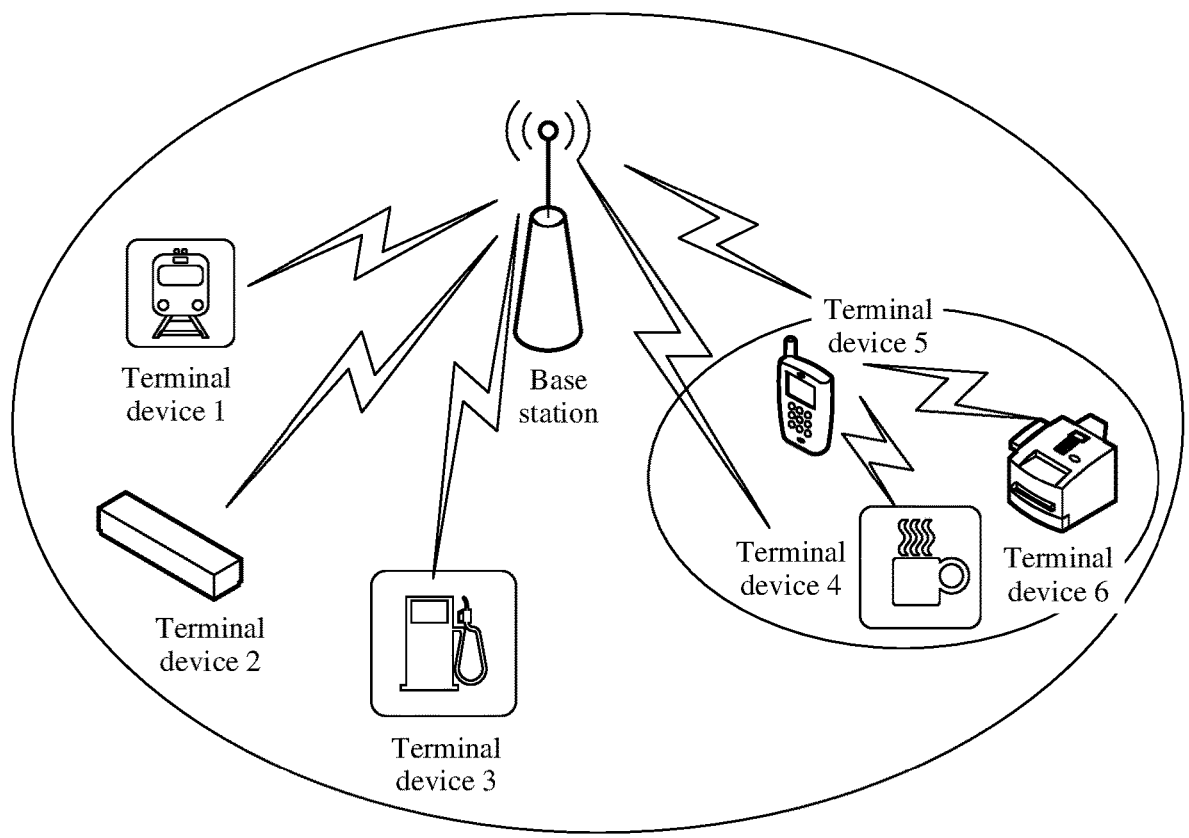
FIG. 2 is a simplified schematic diagram of an architecture of another communication system according to an embodiment of this application.

The foregoing communication system may be a 5G NR system. The embodiments of this application may alternatively be applied to another communication system. As long as an entity in the communication system needs to send transmission direction indication information, another entity needs to receive the indication information, and determine, based on the indication information, a transmission direction that is within a time period. For example, FIG. 2 is an example diagram of an architecture of another communication system according to an embodiment of this application. As shown in FIG. 2, a communication system includes a base station and a terminal device 1 to a terminal device 6. In the communication system, the terminal device 1 to the terminal device 6 may send uplink data to the base station, and the base station receives the uplink data sent by the terminal device 1 to the terminal device 6. Alternatively, the base station may send downlink data to the terminal device 1 to the terminal device 6, and the terminal device 1 to the terminal device 6 receive the downlink data. In addition, a communication system may alternatively include the terminal device 4 to the terminal device 6. In the communication system, the terminal device 5 may receive uplink information sent by the terminal device 4 or the terminal device 6, and the terminal device 5 sends downlink information to the terminal device 4 or the terminal device 6.

The network device and the terminal device may be deployed on land, and include an indoor or outdoor device, a handheld device, or a vehicle-mounted device; may be deployed on a water surface; or may be deployed on an aircraft, a balloon, and a satellite in the air. Application scenarios of the network device and the terminal device are not limited in the embodiments of this application.

Communication between the network device and the terminal device and communication between terminal devices may be performed by using a licensed spectrum, an unlicensed spectrum, or both the licensed spectrum and the unlicensed spectrum. A spectrum resource used between the network device and the terminal device is not limited in the embodiments of this application.

The embodiments of this application are applicable to downlink signal transmission, are applicable to uplink signal transmission, or are applicable to device-to-device (D2D) signal transmission. For the D2D signal transmission, a sending device is a terminal device, and a corresponding receiving device is also a terminal device. For the downlink signal transmission, a sending device is a network device, and a corresponding receiving device is a terminal device. The network device determines at least one parameter based on a first message, where the at least one parameter is used to indicate a first reference signal pattern, so that the network device sends a first reference signal based on the first reference signal pattern. For the uplink signal transmission, a sending device is a terminal device, and a corresponding receiving device is a network device. The terminal device determines the at least one parameter based on the first message, where the at least one parameter is used to indicate the first reference signal pattern, so that the terminal device sends the first reference signal based on the first reference signal pattern.

The following describes the communication method provided in this application with reference to the accompanying drawings by using an example in which a network device performs uplink transmission with a terminal device.

Figure 3:
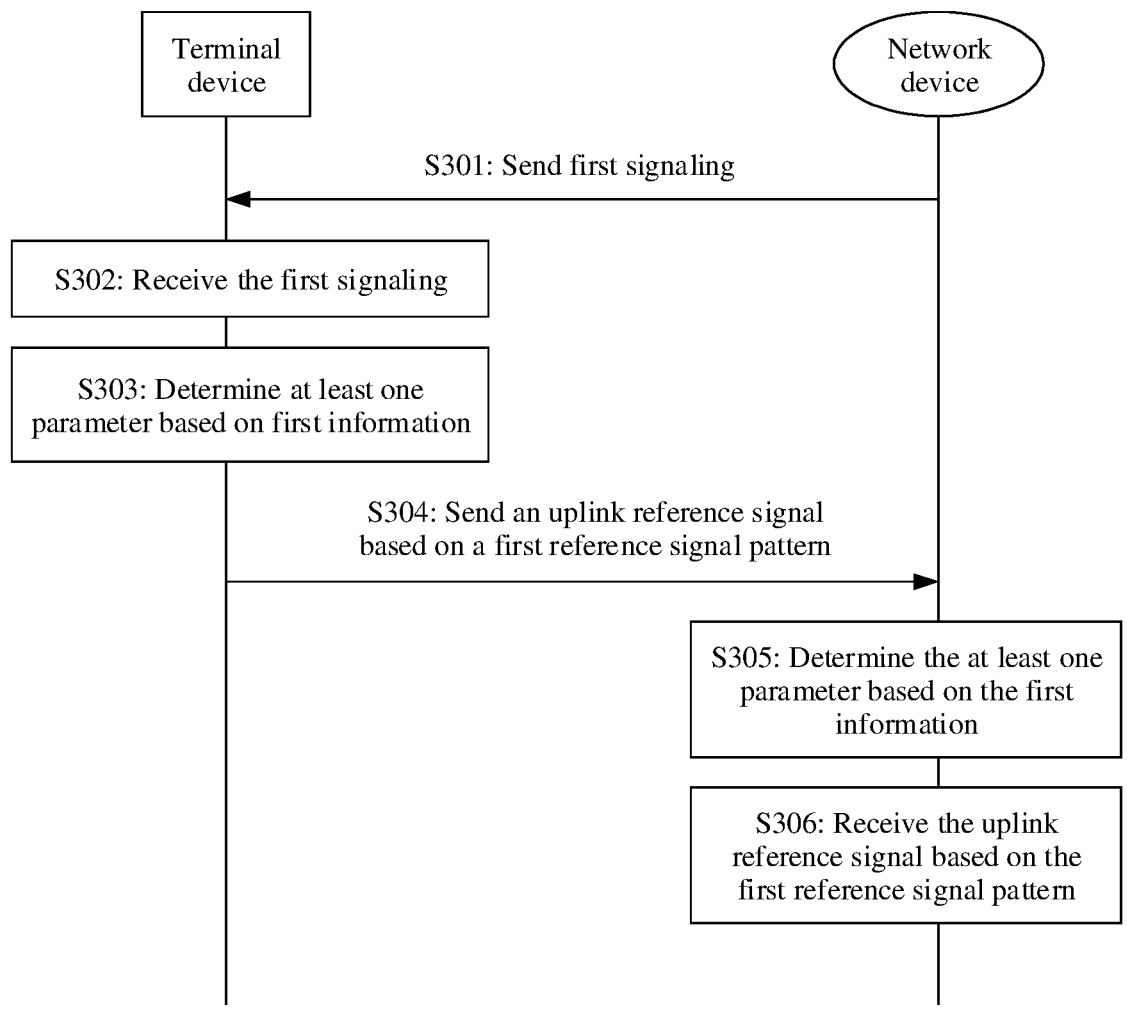
FIG. 3 is a flowchart of a communication method according to an embodiment of this application.

FIG. 3 is a flowchart of a communication method according to an embodiment of this application. As shown in FIG. 3, the method may include the following steps.

S301: A network device sends first signaling to a terminal device.

In an optional design, after determining, based on channel quality of a PUSCH, a modulation order and a code rate that are used for uplink transmission, the network device may notify the terminal device of an MCS index value by using the first signaling.

When transmission quality of the PUSCH is better (for example, an SNR is higher), the network device selects a higher modulation order and code rate, and indicates, based on a predefined MCS table, that the terminal device may use a higher MCS index value when performing uplink transmission. When the transmission quality of the PUSCH is poorer (for example, the SNR is lower), the network device selects a lower modulation order and code rate, and indicates, based on the predefined MCS table, that the terminal device may use a lower MCS index value when performing uplink transmission.

For the MCS table for PUSCH uplink transmission, refer to Table 6.1.4.1-1 and Table 6.1.4.1-2 in the protocol TS 38.214.

Specifically, the first signaling may be downlink control information (DCI). For example, the DCI includes an MCS index value field of a 5-bit length, and a bit status (namely, bit information) carried in the MCS index value field indicates an MCS index. The terminal device can flexibly use the MCS index indicated by the DCI, to adapt to uplink transmission channel quality.

S302: The terminal device receives the first signaling sent by the network device The first signaling may be the DCI. For a specific explanation, refer to the description in S301. Details are not described again.

S303: The terminal device determines at least one parameter based on first information.

In a first design, the first information may be first MCS information such as a first MCS index. The terminal device may obtain the first MCS index by using the received first signaling. That is, the first signaling includes the first MCS index.

In a second design, the first information may include the first MCS index and first RS sending period information. The first RS sending period information may be a first RS sending period or an index of the first RS sending period. This is not limited in this application. The first RS sending period information may come from the network device. Specifically, the network device may notify the terminal device of the first RS sending period information by using the first signaling or higher layer signaling, so that the terminal device may obtain the first RS sending period information by using the received first signaling or higher layer signaling.

The at least one parameter is used to indicate a first reference signal pattern. The at least one parameter may include at least one of a DMRS type and a DMRS additional position.

For a specific implementation of S303, refer to the following detailed description.

In a possible implementation, the terminal device may determine the DMRS additional position based on the first information, and the DMRS type and a front-loaded DMRS time domain length may be obtained by using higher layer signaling. For example, the network device sends the higher layer signaling to the terminal device, where the higher layer signaling includes the DMRS type and the front-loaded DMRS time domain length.

In another possible implementation, the terminal device may determine the DMRS additional position and the DMRS type based on the first information, and the front-loaded DMRS time domain length may be obtained by using higher layer signaling. For example, the network device sends the higher layer signaling to the terminal device, where the higher layer signaling includes the front-loaded DMRS time domain length. The higher layer signaling may be RRC signaling.

S304: The terminal device sends an uplink reference signal based on the first reference signal pattern.

After determining the DMRS additional position, the DMRS type, and the front-loaded DMRS time domain length, the terminal device may determine the first reference signal pattern based on parameters such as the DMRS additional position, the DMRS type, and the front-loaded DMRS time domain length. The front-loaded DMRS time domain length is usually directly configured by using higher layer signaling, and is related to a quantity of data transmission layers. For example, when a quantity of parallel transmission layers is greater than 6, the front-loaded DMRS time domain length is configured as 2 by using the higher layer signaling; when the quantity of parallel transmission layers is less than or equal to 6, the front-loaded DMRS time domain length is configured as 1 by using the higher layer signaling. A time-frequency resource occupied for sending a first reference signal may be determined based on the first reference signal pattern.

For example, a first reference signal resource is determined based on the first reference signal pattern, and the first reference signal is sent on the first reference signal resource. A second reference signal resource is determined based on the first reference signal pattern, and a second reference signal is sent on the second reference signal resource. The first reference signal resource and the second reference signal resource herein may be different resources in time domain. For example, a DMRS satisfying the first reference signal resource is sent in a slot 1, and a DMRS satisfying the second reference signal resource is further sent in a slot 2. The first reference signal resource and the second reference signal resource belong to resources in different slots.

S305: The network device determines the at least one parameter based on the first information.

In the first design, the first information may be the first MCS information such as the first MCS index. The terminal device may obtain the first MCS index by using the received first signaling. That is, the first signaling includes the first MCS index.

In the second design, the first information may include the first MCS index and the RS sending period information.

For a specific explanation, refer to the description in S303. Details are not described again.

S306: The network device receives the uplink reference signal based on the first reference signal pattern.

Because the first MCS information is notified by the network device to the terminal device, the network device may determine the at least one parameter based on the first MCS information, where the at least one parameter is used to determine the first reference signal pattern. In this way, the network device receives, on a corresponding resource based on the first reference signal pattern, the uplink reference signal sent by the terminal device.

Alternatively, because the first MCS information and the RS sending period information are notified by the network device to the terminal device, the network device may determine the at least one parameter based on the first MCS information and the RS sending period information, where the at least one parameter is used to determine the first reference signal pattern. In this way, the network device receives the uplink reference signal on the corresponding resource based on the first reference signal pattern.

According to the communication method provided in this embodiment of this application, a parameter used to determine a DMRS pattern may be (implicitly) indicated by using MCS information or the MCS information and the RS sending period information. Compared with a manner of notifying the parameter of the DMRS pattern by using RRC signaling, the method can more flexibly configure the related parameter of the DMRS pattern, adapt to a change of an actual channel, and reduce some bit overheads.

Figure 4:
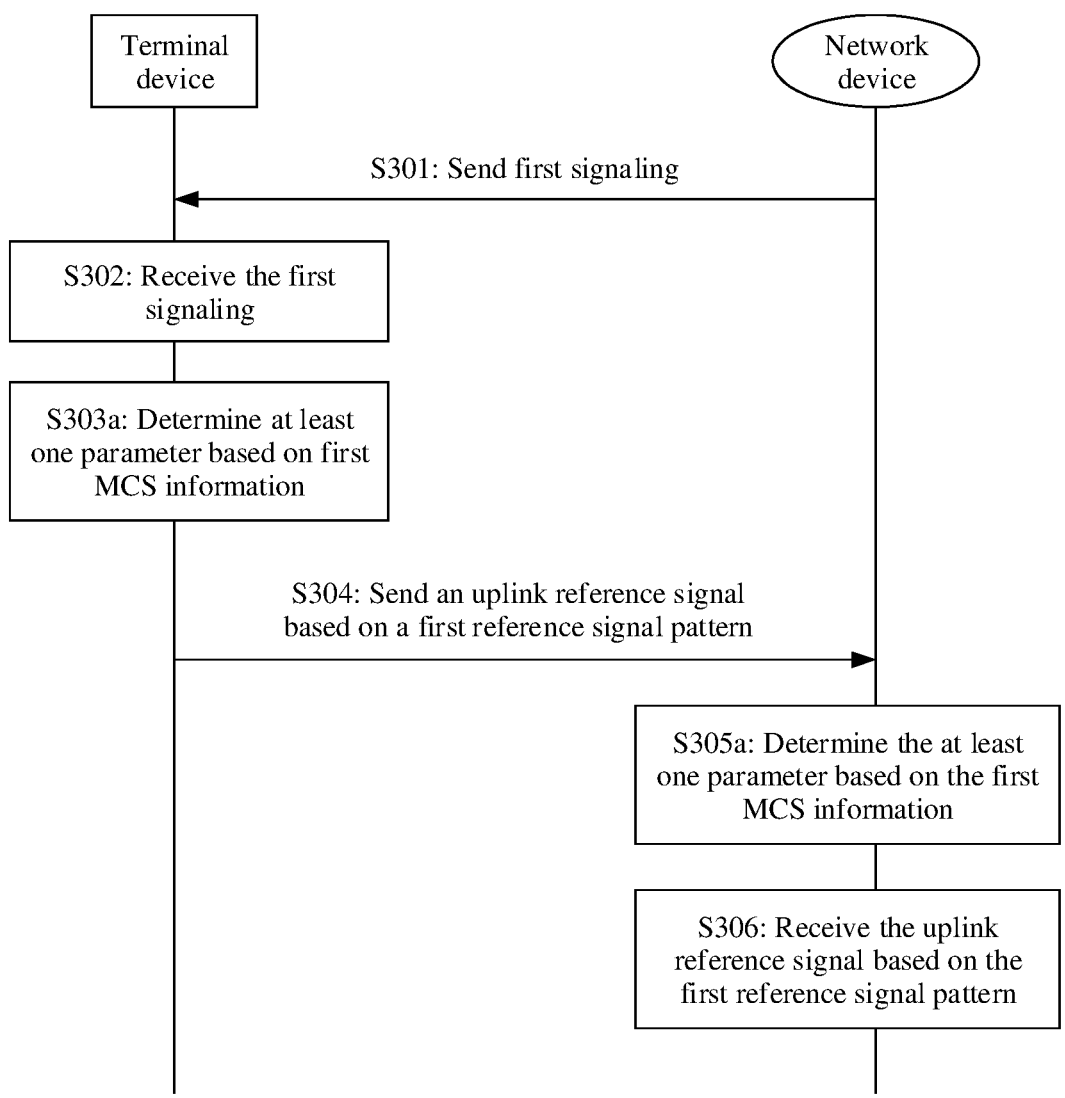
FIG. 4 is a flowchart of another communication method according to an embodiment of this application.

The following describes in detail an implementation of determining the reference signal pattern based on the MCS information. FIG. 4 is a flowchart of a communication method according to an embodiment of this application. An example in which the first information is the first MCS information is used for description herein. For a detailed explanation of S303, refer to description in S303a. For a detailed explanation of S305, refer to description in S305a. For explanations of S301, S302, S304, and S306, refer to the description of the steps in the method shown in FIG. 3. Details are not described again.

S303a: The terminal device determines the at least one parameter based on the first MCS information.

Specifically, the at least one parameter is used to indicate the first reference signal pattern. The at least one parameter includes at least one of the DMRS additional position and the DMRS type. The first reference signal pattern may be determined by using at least one of the DMRS additional position, the DMRS type, and the front-loaded DMRS time domain length. It may be understood that "determining the at least one parameter based on the first MCS information, where the at least one parameter is used to indicate the first reference signal pattern" may alternatively be expressed as "determining the first reference signal pattern based on the first MCS information, where the first reference signal pattern is indicated by using the at least one parameter".

In some embodiments, the at least one parameter includes the DMRS additional position. There is a first correspondence between the first MCS information and the DMRS additional position. The terminal device may determine a value of the DMRS additional position based on the first MCS information and the first correspondence. The first correspondence includes a plurality of pieces of MCS information and values of the DMRS additional position. The first correspondence may be an overall correspondence between a plurality of MCS information ranges and the values of the DMRS additional position. The terminal device may determine, by using the first correspondence, whether the plurality of pieces of MCS information in the first correspondence cover the first MCS information. If the plurality of pieces of MCS information cover the first MCS information, the terminal device obtains the value of the DMRS additional position corresponding to the first MCS information.

For example, it is assumed that the MCS information is an MCS index, and the values of the DMRS additional position include pos0, pos1, pos2, and pos3. When maxlength is configured as single, a correspondence between the MCS index and the DMRS additional position may be presented in a form of a table. That is, Table 2 presents the first correspondence.

TABLE 2

| MCS index | DMRS additional position | Modulation order & code rate (x/1024) |
|---|---|---|
| $a \leq I_{MCS} < b$ | pos3 | Value corresponding to $I_{MCS}$ |
| $b \leq I_{MCS} < c$ | pos2 | |
| $c \leq I_{MCS} < d$ | pos1 | |
| $d \leq I_{MCS}$ | pos0 | |

$I_{MCS}$ represents the MCS index. It can be learned from Table 2 that, when $a \leq I_{MCS} < b$, a value of the DMRS additional position is pos3; when $b \leq I_{MCS} < c$, a value of the DMRS additional position is pos2; when $c \leq I_{MCS} < d$, a value of the DMRS additional position is pos1; when $d \leq I_{MCS}$, a value of the DMRS additional position is pos0. a, b, c, and d are all non-negative integers. A value range is a value range 0 to 31 of an MCS index in an MCS table. For example, in Table 5.1.3.1-1, a=0, b=5, c=10, and d=17.

Optionally, the first correspondence may alternatively be an overall correspondence between a plurality of MCS information discrete values and values of the DMRS additional position. For example, when maxlength is configured as single, a correspondence between the MCS index and the DMRS additional position may be presented in a form of a table. That is, Table 3 presents the first correspondence.

TABLE 3

| MCS index | DMRS additional position | Modulation order & code rate (x/1024) |
|---|---|---|
| $I_{MCS} \in \Lambda_1$ | pos3 | Value corresponding to $I_{MCS}$ |
| $I_{MCS} \in \Lambda_2$ | pos2 | |
| $I_{MCS} \in \Lambda_3$ | pos1 | |
| $I_{MCS} \in \Lambda_4$ | pos0 | |

When $I_{MCS} \in \Lambda_1$, a value of the DMRS additional position is pos3. When $I_{MCS} \in \Lambda_2$, a value of the DMRS additional position is pos2. When $I_{MCS} \in \Lambda_3$, a value of the DMRS additional position is pos1. When $I_{MCS} \in \Lambda_4$, a value of the DMRS additional position is pos0. $\Lambda_1$, $\Lambda_2$, $\Lambda_3$, and $\Lambda_4$ represent possible value sets of the MCS index. In addition, the value sets $\Lambda_1$, $\Lambda_2$, $\Lambda_3$, and $\Lambda_4$ are completely different. For example, a value of $\Lambda_1$ is $\{0, 1, 2, 3, 4\}$; a value of A is $\{5, 6, 7, 8, 9\}$; a value of A is $\{10, 11, \ldots, 16\}$; a value of $\Lambda_4$ is $\{17, 18, \ldots, 31\}$.

Further, the terminal device needs to first obtain the first correspondence before the terminal device determines the value of the DMRS additional position based on the first MCS information and the first correspondence.

In a possible design, the first correspondence is predefined. Predefining may be understood as predefining in a standard or a protocol. The terminal device and the network device need to prestore the predefined first correspondence. After obtaining the first MCS information, the terminal device or the network device may obtain the first correspondence locally, and determine the DMRS additional position corresponding to the first MCS information.

In another possible design, the first correspondence is configured by using the higher layer signaling or configured by using the first signaling. For example, the higher layer signaling may be the RRC signaling. Specifically, the first correspondence may be configured by using the higher layer signaling or the first signaling. After obtaining the first MCS information and obtaining the first correspondence from the higher layer signaling or the first signaling, the terminal device or the network device determines the DMRS additional position corresponding to the first MCS information.

Alternatively, index information of the first correspondence may be configured by using the higher layer signaling or the first signaling. The terminal device and the network device prestore the predefined first correspondence. After obtaining the first MCS information and obtaining the index information of the first correspondence from the higher layer signaling or the first signaling, the terminal device or the network device may obtain the first correspondence locally, and determine the DMRS additional position corresponding to the first MCS information.

It should be noted that the first correspondence is one of a plurality of correspondences. The plurality of correspondences may be correspondences set based on a plurality of moving scenarios. For example, the first correspondence is set based on a moving speed of the terminal device, and a value range of the MCS index is set for different moving speeds. For example, when the moving speed is 0.1 km/h quasi-static, a correspondence between the MCS index and the DMRS additional position may be presented in a form of a table. That is, Table 4 presents the first correspondence, where a=0, b=3, c=, and d=7. When the moving speed is 3 km/h, a correspondence between the MCS index and the DMRS additional position may be presented in a form of a table. That is, Table 5 presents the first correspondence, where a=0, b=5, c=10, and d=17.

TABLE 4

| MCS index | DMRS additional position | Modulation order & code rate (x/1024) |
|---|---|---|
| $0 \leq I_{MCS} < 3$ | pos3 | Value corresponding to $I_{MCS}$ |
| $3 \leq I_{MCS} < 4$ | pos2 | |
| $4 \leq I_{MCS} < 7$ | pos1 | |
| $7 \leq I_{MCS}$ | pos0 | |

TABLE 5

| MCS index | DMRS additional position | Modulation order & code rate (x/1024) |
|---|---|---|
| $0 \leq I_{MCS} < 5$ | pos3 | Value corresponding to $I_{MCS}$ |
| $5 \leq I_{MCS} < 10$ | pos2 | |
| $10 \leq I_{MCS} < 17$ | pos1 | |
| $17 \leq I_{MCS}$ | pos0 | |

Generally, in a same channel condition, increasing a quantity of symbols occupied by a DMRS additional position in a DMRS pattern helps more accurately estimate a channel and correctly perform decoding, and improves communication performance of a system. However, a larger quantity of DMRS symbols causes more overheads, and therefore a resource used for data transmission is reduced. Therefore, spectral efficiency is affected by a combination of two factors: channel estimation and DMRS overheads. Generally, when a channel condition is poorer (for example, an SNR is quite low), a plurality of columns of additional DMRSs are required for correct decoding, to implement optimal spectral efficiency. Correspondingly, an MCS index having a smaller number may be configured. When the channel condition is better (for example, the SNR is quite high), only a small quantity of additional DMRSs are required for correct decoding, to implement optimal spectral efficiency. Correspondingly, an MCS index having a larger number may be configured. Therefore, a value of the DMRS additional position may be implicitly indicated by using an MCS index value.

In some other embodiments, the at least one parameter includes the DMRS type. There is a second correspondence between the first MCS information and the DMRS type. The terminal device may determine a value of the DMRS type based on the first MCS information and the second correspondence. The second correspondence includes a plurality of pieces of MCS information and values of the DMRS type. The second correspondence may be an overall correspondence between a plurality of MCS information ranges and the values of the DMRS type. The terminal device may determine, by using the second correspondence, whether the plurality of pieces of MCS information in the second correspondence cover the first MCS information. If the plurality of pieces of MCS information cover the first MCS information, the terminal device obtains the value of the DMRS type corresponding to the first MCS information.

For example, it is assumed that the MCS information is an MCS index, and the values of the DMRS type include type1 and type2. When maxlength is configured as single, a correspondence between the MCS index and the DMRS type may be presented in a form of a table. That is, Table 6 presents the second correspondence.

TABLE 6

| MCS index | DMRS type | Modulation order & code rate (x/1024) |
|---|---|---|
| $e \leq I_{MCS} < f$ | type1 | Value corresponding to $I_{MCS}$ |
| $f \leq I_{MCS} \leq g$ | type2 | |

$I_{MCS}$ represents the MCS index. It can be learned from Table 6 that, when $e \leq I_{MCS} < f$, a value of the DMRS type is type1; when $f \leq I_{MCS} \leq g$, a value of the DMRS type is type2. f and g are both non-negative integers. A value range is a value range 0 to 31 of an MCS index in an MCS table. For example, in Table 5.1.3.1-1, e=0, f=10, and g=31.

Optionally, the second correspondence may alternatively be an overall correspondence between a plurality of MCS information discrete values and values of the DMRS type. For example, when maxlength is configured as single, a correspondence between the MCS index and the DMRS type may be presented in a form of a table. That is, Table 7 presents the second correspondence.

TABLE 7

| MCS index | DMRS type | Modulation order & code rate (x/1024) |
|---|---|---|
| $I_{MCS} \in \Lambda_5$ | type1 | Value corresponding to $I_{MCS}$ |
| $I_{MCS} \in \Lambda_6$ | type2 | |

When $I_{MCS} \in \Lambda_5$, a value of the DMRS type is type1. When $I_{MCS} \in \Lambda_6$, a value of the DMRS type is type2. $\Lambda_5$ and $\Lambda_6$ represent possible value sets of the MCS index. In addition, the value sets $\Lambda_5$ and $\Lambda_6$ are completely different. For example, a value of $\Lambda_5$ is {0, 1, . . . , 22}; a value of $\Lambda_6$ is {23, 24, . . . , 31}.

Further, the terminal device needs to first obtain the second correspondence before the terminal device determines the DMRS type based on the first MCS information and the second correspondence. In a possible design, the second correspondence is predefined. In another possible design, the second correspondence is configured by using the higher layer signaling or configured by using the first signaling. Alternatively, index information of the second correspondence may be configured by using the higher layer signaling or the first signaling. For details, refer to the foregoing description of the first correspondence. Details are not described again.

It should be noted that the second correspondence is one of a plurality of correspondences. The plurality of correspondences may be correspondences set based on a plurality of moving scenarios. For example, the second correspondence is set based on a moving speed of the terminal device, and a value range of the MCS index is set for different moving speeds. For example, when the moving speed is 3 km/h quasi-static, a correspondence between the MCS index and the DMRS additional position may be presented in a form of a table. That is, Table 8 presents the second correspondence, where e=0, f=22, and g=31. When the moving speed is 0 km/h, a correspondence between the MCS index and the DMRS additional position may be presented in a form of a table. That is, Table 9 presents the second correspondence, where e1=0, f1=31, e2=22, and f2=31.

TABLE 8

| MCS index | DMRS type | Modulation order & code rate (x/1024) |
|---|---|---|
| $0 \le I_{MCS} < 22$ | type1 | Value corresponding to $I_{MCS}$ |
| $22 \le I_{MCS} \le 31$ | type2 | |

TABLE 9

| MCS index | DMRS type | Modulation order & code rate (x/1024) |
|---|---|---|
| $e1 \le I_{MCS} < f1$ | type1 | Value corresponding to $I_{MCS}$ |
| $e2 \le I_{MCS} \le f2$ | type2 | |

When the value of the DMRS type is type1, each DMRS symbol occupies six subcarriers in one RB, and a subcarrier spacing is 2. When the value of the DMRS type is type2, each DMRS symbol occupies four subcarriers in one RB, and a subcarrier spacing is 4. Therefore, a DMRS of type1 occupies denser frequency domain subcarriers than a DMRS of type2, and a frequency domain diversity effect of the DMRS of type1 is better than that of the DMRS of type2. When a channel condition is poorer (for example, an SNR is lower), the DMRS of type1 can be used to more accurately estimate a channel and perform correct decoding by using denser DMRSs and a frequency-domain diversity gain, to implement better spectral efficiency. However, when the channel condition is better (for example, the SNR is higher), a small quantity of DMRSs can also ensure accurate channel estimation. Therefore, pilot overheads are fewer and spectral efficiency is higher by using the DMRS of type2. Generally, when the channel condition is poorer, a smaller MCS index is used; when the channel condition is better, a larger MCS index is used. Therefore, the value of the DMRS type may be implicitly indicated by using the MCS index.

In some other embodiments, the at least one parameter includes the DMRS additional position and the DMRS type. There is a third correspondence among the first MCS information, the DMRS additional position, and the DMRS type. The terminal device may determine a value of the DMRS additional position and a value of the DMRS type based on the first MCS information and the third correspondence. The third correspondence includes a plurality of pieces of MCS information, values of the DMRS additional position, and values of the DMRS type. The third correspondence may be an overall correspondence among a plurality of MCS information ranges, the values of the DMRS additional positions, and the values of the DMRS type. The terminal device may determine, by using the third correspondence, whether the plurality of pieces of MCS information in the third correspondence cover the first MCS information. If the plurality of pieces of MCS information cover the first MCS information, the terminal device obtains the value of the DMRS additional position and the value of the DMRS type that correspond to the first MCS information.

For example, it is assumed that the MCS information is an MCS index, the values of the DMRS additional position include pos0, pos1, pos2, and pos3, and the values of the DMRS type include type1 and type2. When maxlength is configured as single, a correspondence among the MCS index, the DMRS additional position, and the DMRS type may be presented in a form of a table. That is, Table 10 presents the third correspondence.

TABLE 10

| MCS index | DMRS additional position | DMRS type | Modulation order & code rate (x/1024) |
|---|---|---|---|
| $h \le I_{MCS} < i$ | pos3 | type1 | Value corresponding to $I_{MCS}$ |
| $i \le I_{MCS} < j$ | pos2 | | |
| $j \le I_{MCS} < k$ | pos1 | | |
| $k \le I_{MCS}$ | pos0 | type2 | |

$I_{MCS}$ represents the MCS index. It can be learned from Table 10 that, when $h \le I_{MCS} < i$, a value of the DMRS additional position is pos3, and a value of the DMRS type is type1; when $i \le I_{MCS} < j$, a value of the DMRS additional position is pos2, and a value of the DMRS type is type1; when $j \le I_{MCS} < k$, a value of the DMRS additional position is pos1, and a value of the DMRS type is type1; when $k \le I_{MCS}$, a value of the DMRS additional position is pos0, and a value of the DMRS type is type2. j, i, j, and k are all non-negative integers. A value range is a value range 0 to 31 of an MCS index in an MCS table. For example, in Table 5.1.3.1-1, h=0, i=5, j=10, and k=17.

It should be noted that the correspondence between the DMRS type and the DMRS additional position shown in Table 10 is merely an example for description, and values of the DMRS additional position corresponding to type2 may alternatively be a combination of pos1, pos2, pos3, and the like.

Optionally, the third correspondence may alternatively be an overall correspondence among a plurality of MCS information discrete values, values of the DMRS type, and values of the DMRS additional position. For example, when maxlength is configured as single, a correspondence among the MCS index, the DMRS additional position, and the DMRS type may be presented in a form of a table. That is, Table 11 presents the third correspondence.

TABLE 11

| MCS index | DMRS additional position | DMRS type | Modulation order & code rate (x/1024) |
|---|---|---|---|
| $I_{MCS} \in \Lambda_7$ | pos3 | type1 | Value corresponding to $I_{MCS}$ |
| $I_{MCS} \in \Lambda_8$ | pos2 | | |
| $I_{MCS} \in \Lambda_9$ | pos1 | | |
| $I_{MCS} \in \Lambda_{10}$ | pos1 | type2 | |
| $I_{MCS} \in \Lambda_{11}$ | pos0 | | |

When $I_{MCS} \in \Lambda_7$, a value of the DMRS additional position is pos3, and a value of the DMRS type is type1. When $I_{MCS} \in \Lambda_8$, a value of the DMRS additional position is pos2, and a value of the DMRS type is type. When $I_{MCS} \in \Lambda_9$, a value of the DMRS additional position is pos1, and a value of the DMRS type is type1. When $I_{MCS} \in \Lambda_{10}$, a value of the DMRS additional position is pos1, and a value of the DMRS type is type1. When $I_{MCS} \in \Lambda_{11}$, a value of the DMRS additional position is pos0, and a value of the DMRS type is type2. $\Lambda_7$, $\Lambda_8$, $\Lambda_9$, $\Lambda_{10}$, and $\Lambda_{11}$ represent possible value sets of the MCS index. In addition, the value sets $\Lambda_7$, $\Lambda_8$, $\kappa_9$, $\Lambda_{10}$, and $\Lambda_{11}$ are completely different. For example, a value of is $\{0, 1, 2, 3, 4\}$; a value of is $\{5, 6, 7, 8, 9\}$; a value of $\Lambda_9$ is $\{12, 13\}$; a value of $\Lambda_{10}$ is $\{10, 11, 14, 15, 16\}$; a value of $\Lambda_{11}$ is $\{17, \ldots, 31\}$.

Further, the terminal device needs to first obtain the third correspondence before the terminal device determines the DMRS type and the DMRS additional position based on the first MCS information and the third correspondence. In a possible design, the third correspondence is predefined. In another possible design, the third correspondence is configured by using the higher layer signaling or configured by using the first signaling. Alternatively, index information of the third correspondence may be configured by using the higher layer signaling or the first signaling. For details, refer to the foregoing description of the first correspondence. Details are not described again.

It should be noted that the third correspondence is one of a plurality of correspondences. The plurality of correspondences may be correspondences set based on a plurality of moving scenarios. For example, the third correspondence is set based on a moving speed of the terminal device, different value ranges of the MCS index may be set for different moving speeds, and the different value ranges of the MCS index correspond to different DMRS types and DMRS additional positions. In some embodiments, for a same moving scenario, at least one of the first correspondence, the second correspondence, and the third correspondence may be presented in a form of a same table. That is, in some possible embodiments, at least two or all of the first correspondence, the second correspondence, and the third correspondence may be a same correspondence.

When a channel condition is poorer (for example, an SNR is lower), more DMRSs are required to ensure a receive end to accurately estimate a channel and demodulate data. Therefore, a plurality of columns of additional DMRSs are used (denser in time domain), and the DMRS type is configured as type1 (denser in frequency domain), to implement higher spectral efficiency. In this case, the channel condition is poorer, and the network device configures an MCS index having a smaller number. Therefore, when an MCS index value is smaller, more columns of additional DMRSs are used, and the DMRS type is configured as type1.

When the channel condition is better (for example, the SNR is higher), only fewer DMRSs are required to accurately estimate the channel and correctly perform data demodulation and decoding. Therefore, fewer additional DMRSs and a DMRS of type2 are configured to reduce pilot overheads and implement higher spectral efficiency. In this case, the channel condition is good, and the network device configures an MCS index having a larger number. Therefore, when the MCS index value is larger, fewer columns of additional DMRSs are used, and the DMRS type is configured as type2.

In conclusion, a value of the DMRS additional position and a value of the DMRS type may be implicitly indicated by using the MCS index.

S305a: The network device determines the at least one parameter based on the first MCS information.

For a specific explanation, refer to the description in S303a. Details are not described again.

According to the communication method provided in this embodiment of this application, a parameter used to determine a DMRS pattern may be (implicitly) indicated by using the MCS index. Compared with a manner of notifying, by using RRC signaling, the parameter for determining the DMRS pattern, the method can more flexibly configure the related parameter of the DMRS pattern, adapt to a change of an actual channel, and reduce some bit overheads.

In a 5G communication era in which all things are connected, massive machine-type communications (mMTC) become one of main application scenarios in a current NR system. Particularly, for application such as video surveillance, where a terminal device is placed at a stable height, because positions of scatterers in a network device, the terminal device, and a channel basically remain unchanged, an uplink wireless channel from the terminal device to the network device basically remains unchanged in a period of time (for example, at a level of hundreds of milliseconds). Such a channel may be referred to as a quasi-static wireless channel. For the quasi-static channel, a wireless channel estimated at a moment and a wireless channel estimated at another moment basically do not change.

Therefore, regardless of a change speed of a channel in time domain, a DMRS is configured in each TTI to estimate the channel. Consequently, DMRS overheads are relatively large, and particularly, when uplink transmission is limited, spectral efficiency of transmission is relatively low. Therefore, configuring the DMRS in the TTI in time domain cannot flexibly adapt to a quasi-static or invariance feature of the channel.

In this application, DMRSs may be periodically configured, to effectively resolve a problem of large DMRS overheads in a scenario in which a change of the channel in time domain is relatively slow.

Figure 5:
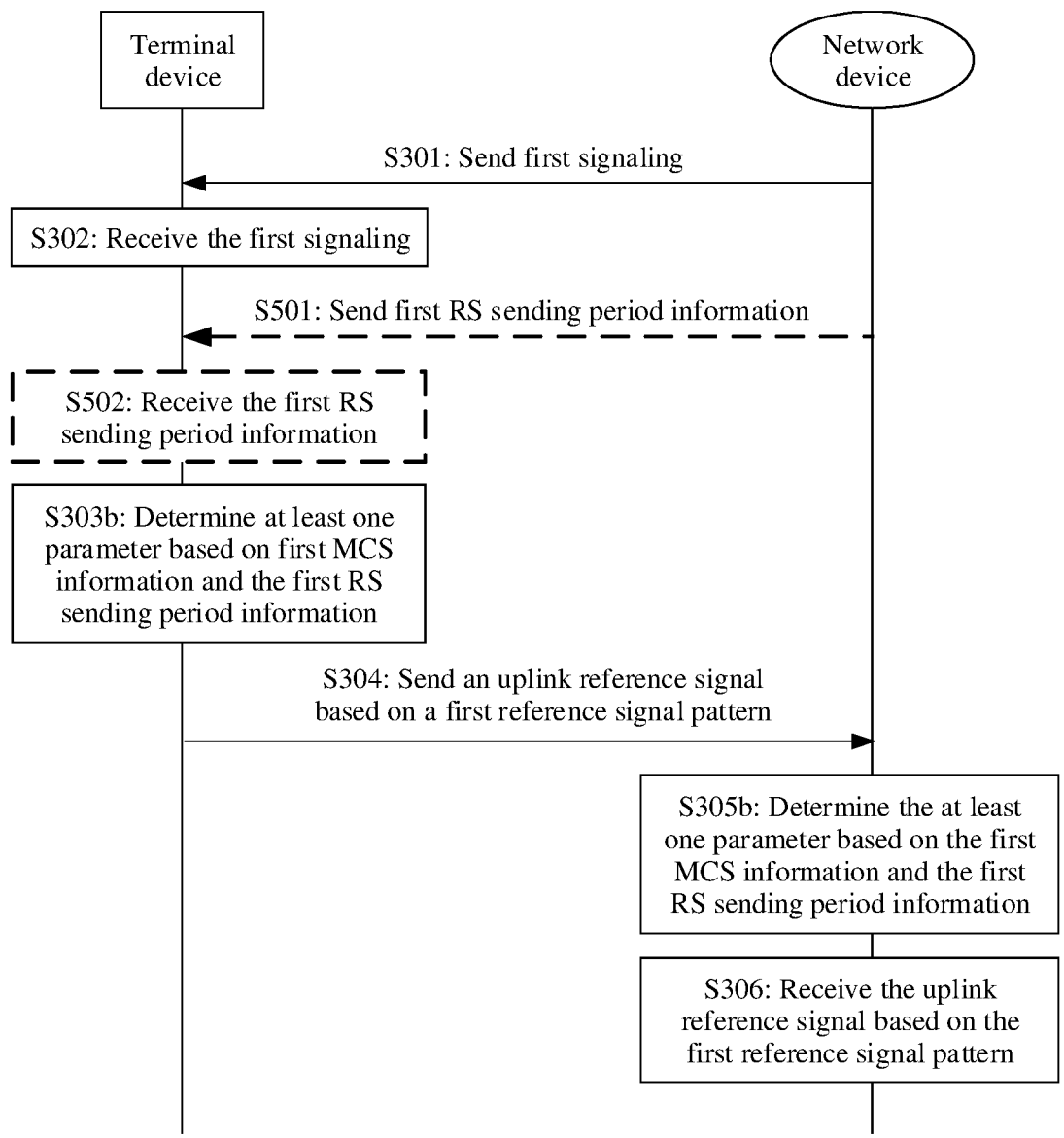
FIG. 5 is a flowchart of still another communication method according to an embodiment of this application.

The following describes in detail an implementation of determining the reference signal pattern based on the MCS information and the RS sending period information. FIG. 5 is a flowchart of a communication method according to an embodiment of this application. An example in which the first information is the first MCS information is used for description herein. For a detailed explanation of S303, refer to description in S303b. For a detailed explanation of S305, refer to description in S305b. For explanations of S301, S302, S304, and S306, refer to the description of the steps in the method shown in FIG. 3. Details are not described again. In addition, the method further includes S501 and S502.

S501: The network device sends the first RS sending period information to the terminal device.

In some embodiments, the network device may configure the RS sending period based on a moving speed of the terminal device. A length of the RS sending period may be an integer multiple of a length of a TTI.

For example, when the terminal device is in a high-speed state, a DMRS may be configured in each TTI. That is, an RS sending period is one TTI. When the terminal device is in a medium-high-speed state, one DMRS may be configured in every five TTIs. That is, an RS sending period is five TTIs. When the terminal device is in a medium-low-speed state, one DMRS may be configured in every 10 TTIs. That is, an RS sending period is 10 TTIs. When the terminal device is in a low-speed state or in a static state, one DMRS may be configured in every 20 TTIs. That is, an RS sending period is 20 TTIs. During actual application, other more moving speed levels of the terminal device may be further set. This is not limited in this application.

In a possible design, the terminal device may obtain the first RS sending period information by using the received first signaling. That is, the first signaling includes the first RS sending period information. The first RS sending period information includes the first RS sending period or the index of the first RS sending period.

For example, the first signaling may be the DCI. The DCI includes an x-bit indication field, and a bit status (or bit information) carried in the indication field indicates the RS sending period information. For example, two bits included in the DCI are used to indicate the foregoing four RS sending periods. "00" indicates that the RS sending period is one TTI, "01" indicates that the RS sending period is five TTIs, "10" indicates that the RS sending period is 10 TTIs, and "11" indicates that the RS sending period is 20 TTIs.

In another possible design, the terminal device may obtain the first RS sending period information by using the higher layer signaling. That is, the higher layer signaling includes the first RS sending period information. The higher layer signaling may be the RRC signaling.

For example, the RS sending period information is indicated by using a related field of the RRC signaling. For example, field "dmrs-Period" may be configured as "low", "medium", "high", and "very high". "low" indicates that the RS sending period is one TTI. "medium" indicates that the RS sending period is five TTIs. "high" indicates that the RS sending period is 10 TTIs. "very high" indicates that the RS sending period is 20 TTIs.

S502: The terminal device receives the first RS sending period information sent by the network device.

The terminal device may receive, by using the RRC signaling or the first signaling, the first RS sending period information sent by the network device. For a specific explanation, refer to the description in S501. Details are not described again.

In some embodiments, a correspondence between the RS sending period and an index of the RS sending period is predefined. The terminal device and the network device need to prestore the predefined correspondence between the RS sending period and the index of the RS sending period. If the terminal device obtains the index of the first RS sending period, the terminal device may locally obtain the correspondence between the RS sending period and the index of the RS sending period, and determine, based on the index of the first RS sending period, the RS sending period corresponding to the index of the first RS sending period.

In some other embodiments, the network device sends the first RS sending period to the terminal device by using the higher layer signaling or the first signaling, and the terminal device may receive the first RS sending period by using the higher layer signaling or the first signaling.

S303b: The terminal device determines the at least one parameter based on the first MCS information and the first RS sending period information.

Specifically, the at least one parameter is used to indicate the first reference signal pattern. The first reference signal pattern may be determined by using at least one of the DMRS additional position, the DMRS type, and the front-loaded DMRS time domain length. It may be understood that "determining the at least one parameter based on the first MCS information and the first RS sending period information, where the at least one parameter is used to indicate the first reference signal pattern" may alternatively be expressed as "determining the first reference signal pattern based on the first MCS information and the first RS sending period information, where the first reference signal pattern is indicated by using the at least one parameter".

In some embodiments, the at least one parameter includes the DMRS additional position. There is a fourth correspondence among the first MCS information, the first RS sending period, and the DMRS additional position. The terminal device may determine a value of the DMRS additional position based on the first MCS information, the first RS sending period, and the fourth correspondence. The fourth correspondence includes a plurality of pieces of MCS information, a plurality of RS sending periods, and values of the DMRS additional position. The fourth correspondence may be an overall correspondence among a plurality of MCS information ranges, the plurality of RS sending periods, and the values of the DMRS additional position. The terminal device may determine, by using the fourth correspondence, whether the plurality of pieces of MCS information in the fourth correspondence cover the first MCS information and whether the plurality of RS sending periods included in the fourth correspondence cover the first RS sending period. If the plurality of pieces of MCS information cover the first MCS information and the plurality of RS sending periods cover the first RS sending period, the terminal device obtains the value of the DMRS additional position corresponding to the first MCS information and the first RS sending period.

For example, it is assumed that the MCS information is an MCS index, and the values of the DMRS additional position include pos0, pos1, pos2, and pos3. When maxlength is configured as single, a correspondence among the MCS index, the RS sending period, and the DMRS additional position may be presented in a form of a table. That is, Table 12 presents the fourth correspondence.

TABLE 12

| MCS index & RS sending period | DMRS additional position | Modulation order & code rate (x/1024) |
| --- | --- | --- |
| $a \leq I_{MCS} < b$ & x1 | pos3 | Value corresponding to $I_{MCS}$ |
| $b \leq I_{MCS} < c$ & x2 | pos2 | |
| $c \leq I_{MCS} < d$ & x3 | pos1 | |
| $d \leq I_{MCS}$ & x4 | pos0 | |

$I_{MCS}$ represents the MCS index. It can be learned from Table 12 that, when $a \leq I_{MCS} < b$ & x1, a value of the DMRS additional position is pos3; when $b \leq I_{MCS} < c$ & x2, a value of the DMRS additional position is pos2; when $c \leq I_{MCS} < d$ & x3, a value of the DMRS additional position is pos1; when $d \leq I_{MCS}$ & x4, a value of the DMRS additional position is pos0. a, b, c, and d are all non-negative integers. A value range is a value range 0 to 31 of an MCS index in an MCS table. For example, a=0, b=5, c=10, and d=17. x1 to x4 are all non-negative integers. Values of x1 to x4 may be a set of possible period values that are incompletely the same. For example, a value of x1 may be one TTI; a value of x2 may be five TTIs; a value of x3 may be 10 TTIs; a value of x4 may be 20 TTIs.

Optionally, the fourth correspondence may alternatively be an overall correspondence among a plurality of MCS information discrete values, a plurality of RS sending periods, and values of the DMRS additional position. For example, when maxlength is configured as single, a correspondence among the MCS index, the RS sending period, and the DMRS additional position may be presented in a form of a table. That is, Table 13 presents the fourth correspondence.

TABLE 13

| MCS index & RS sending period | DMRS additional position | Modulation order & code rate (x/1024) |
|---|---|---|
| $I_{MCS} \in \Lambda_1$ & x1 | pos3 | Value corresponding to $I_{MCS}$ |
| $I_{MCS} \in \Lambda_2$ & x2 | pos2 | |
| $I_{MCS} \in \Lambda_3$ & x3 | pos1 | |
| $I_{MCS} \in \Lambda_4$ & x4 | pos0 | |

When $I_{MCS} \in \Lambda_1$ & x1, a value of the DMRS additional position is pos3. When $I_{MCS} \in \Lambda_2$ & x2, a value of the DMRS additional position is pos2. When $I_{MCS} \in \Lambda_3$ & x3, a value of the DMRS additional position is pos1. When $I_{MCS} \in \Lambda_4$ & x4, a value of the DMRS additional position is pos0. $\Lambda_1$, $\Lambda_2$, $\Lambda_3$, and $\Lambda_4$ represent possible value sets of the MCS index. In addition, only that $\{I_{MCS} \in \Lambda_1$ & x1$\}$, $\{I_{MCS} \in \Lambda_2$ & x2$\}$, $\{I_{MCS} \in \Lambda_3$ & x3$\}$, and $\{I_{MCS} \in \Lambda_4$ & x4$\}$ are different needs to be ensured. For example, a value of $\Lambda_1$ is a set including $\{11, 18\}$, a value of $\Lambda_2$ is a set including 22, a value of $\Lambda_3$ is a set including 28, and a value of $\Lambda_4$ is a set including 28. Alternatively, it may be summed up as: $\Lambda_1=[0, 1, \ldots, 18]$, $\Lambda_2=[19, \ldots, 22]$, $\Lambda_3=[23, \ldots, 28]$, and $\Lambda_4=[29, \ldots, 31]$. A value of x1 may be five TTIs. A value of x2 may be five TTIs. A value of x3 may be one TTI. A value of x4 may be one TTI.

Further, the terminal device needs to first obtain the fourth correspondence before the terminal device determines the DMRS additional position based on the first MCS information, the first RS sending period, and the fourth correspondence. In a possible design, the fourth correspondence is predefined. In another possible design, the fourth correspondence is configured by using the higher layer signaling or configured by using the first signaling. Alternatively, index information of the fourth correspondence may be configured by using the higher layer signaling or the first signaling. For details, refer to the foregoing description of the first correspondence. Details are not described again.

It should be noted that the fourth correspondence is one of a plurality of correspondences. The plurality of correspondences may be correspondences set based on a plurality of moving scenarios. For example, the fourth correspondence is set based on a moving speed of the terminal device, and a value range of the MCS index is set for different moving speeds. For example, when the moving speed is 0.1 km/h quasi-static, a correspondence among the MCS index, the RS sending period, and the DMRS additional position may be presented in a form of a table. That is, Table 14 presents the fourth correspondence. When the moving speed is 3 km/h, a correspondence among the MCS index, the RS sending period, and the DMRS additional position may be presented in a form of a table. That is, Table 15 presents the fourth correspondence.

TABLE 14

| MCS index & RS sending period | DMRS additional position | Modulation order & code rate (x/1024) |
|---|---|---|
| $0 \le I_{MCS} \le 18$ & five TTIs | pos3 | Value corresponding to $I_{MCS}$ |
| $19 \le I_{MCS} \le 23$ & five TTIs | pos2 | |
| $23 \le I_{MCS} \le 29$ & one TTI | pos1 | |
| $29 \le I_{MCS} \le 31$ & one TTI | pos0 | |

TABLE 15

| MCS index & RS sending period | DMRS additional position | Modulation order & code rate (x/1024) |
|---|---|---|
| $0 \le I_{MCS} \le 6$ & 20 TTIs | pos3 | Value corresponding to $I_{MCS}$ |
| $6 \le I_{MCS} \le 11$ & 10 TTIs | pos2 | |
| $11 \le I_{MCS} \le 18$ & five TTIs | pos1 | |
| $18 \le I_{MCS} \le 31$ & one TTI | pos0 | |

When a channel condition is poorer (for example, an SNR is lower), a determined MCS index is smaller, and more additional DMRSs may be configured to ensure that a receive end accurately estimates a channel and correctly performs demodulation and decoding, to implement better spectral efficiency. When the channel condition is better (for example, the SNR is higher), the determined MCS index is larger, and a small quantity of additional DMRSs may be configured to ensure accurate channel estimation and data demodulation, to implement better spectral efficiency.

In addition, when a configured RS sending period is larger, more columns of additional DMRSs may be implemented based on same pilot overheads, and channel estimation accuracy can be effectively improved by using more additional DMRSs. However, when a configured RS sending period is smaller, only fewer additional DMRSs can be configured when pilot overheads are the same.

In conclusion, when the MCS index is smaller and the RS sending period is larger, more additional DMRSs may be configured; when the MCS index is larger and the RS sending period is smaller, only fewer additional DMRSs can be configured. Therefore, a value of the DMRS additional position may be implicitly indicated by using the MCS index and the RS sending period.

In some other embodiments, the at least one parameter includes the DMRS type. There is a fifth correspondence between the first MCS information, the first RS sending period, and the DMRS type. The terminal device may determine a value of the DMRS type based on the first MCS information, the first RS sending period, and the fifth correspondence. The fifth correspondence includes a plurality of pieces of MCS information, a plurality of RS sending periods, and values of the DMRS type. The fifth correspondence may be an overall correspondence among a plurality of MCS information ranges, the plurality of RS sending periods, and the values of the DMRS type. The terminal device may determine, by using the fifth correspondence, whether the plurality of pieces of MCS information in the fifth correspondence cover the first MCS information and whether the plurality of RS sending periods included in the fifth correspondence cover the first RS sending period. If the plurality of pieces of MCS information cover the first MCS information and the plurality of RS sending periods cover the first RS sending period, the terminal device obtains the value of the DMRS type corresponding to the first MCS information and the first RS sending period.

For example, it is assumed that the MCS information is an MCS index, and the values of the DMRS type include type1 and type2. When maxlength is configured as single, a correspondence among the MCS index, the RS sending period, and the DMRS type may be presented in a form of a table. That is, Table 16 presents the fifth correspondence.

TABLE 16

| MCS index & RS sending period | DMRS type | Modulation order & code rate (x/1024) |
|---|---|---|
| e ≤ $I_{MCS}$ < f & x5 | type1 | Value corresponding to $I_{MCS}$ |
| f ≤ $I_{MCS}$ ≤ g & x6 | type2 | |

$I_{MCS}$ represents the MCS index. It can be learned from Table 16 that, when e≤$I_{MCS}$<f & x5, a value of the DMRS type is type1; when f≤$I_{MCS}$≤g & x6 is used, a value of the DMRS type is type2. e, f, and g are all non-negative integers. A value range is a value range 0 to 31 of an MCS index in an MCS table. For example, in Table 5.1.3.1-1, e=0, f=10, and g=31. x5 and x6 are both non-negative integers. Values of x5 and x6 may be a set of possible period values that are incompletely the same. For example, a value of x5 may be one TTI; a value of x6 may be five TTIs.

Optionally, the fifth correspondence may alternatively be an overall correspondence among a plurality of MCS information discrete values, a plurality of RS sending periods, and values of the DMRS type. For example, when maxlength is configured as single, a correspondence among the MCS index, the RS sending period, and the DMRS type may be presented in a form of a table. That is, Table 17 presents the fifth correspondence.

TABLE 17

| MCS index & RS sending period | DMRS type | Modulation order & code rate (x/1024) |
|---|---|---|
| $I_{MCS}$ ∈ $\Lambda_5$ & x5 | type1 | Value corresponding to $I_{MCS}$ |
| $I_{MCS}$ ∈ $\Lambda_6$ & x6 | type2 | |

When $I_{MCS}$∈$\Lambda_5$ & x5, a value of the DMRS type is type1. When $I_{MCS}$∈$\Lambda_6$ & x6, a value of the DMRS type is type2. $\Lambda_5$ and $\Lambda_6$ represent possible value sets of the MCS index. In addition, the value sets and Λ are incompletely the same.

For example, a value of is {0, 1, . . . , 22}; a value of $\Lambda_6$ is {23, 24, . . . , 31}. A value of x5 may be five TTIs. A value of x6 may be 10 TTIs.

Further, the terminal device needs to first obtain the fifth correspondence before the terminal device determines the DMRS type based on the first MCS information, the first RS sending period, and the fifth correspondence. In a possible design, the fifth correspondence is predefined. In another possible design, the fifth correspondence is configured by using the higher layer signaling or configured by using the first signaling. Alternatively, index information of the fifth correspondence may be configured by using the higher layer signaling or the first signaling. For details, refer to the foregoing description of the first correspondence. Details are not described again.

It should be noted that the fifth correspondence is one of a plurality of correspondences. The plurality of correspondences may be correspondences set based on a plurality of moving scenarios. For example, the first correspondence is set based on a moving speed of the terminal device, and a value range of the MCS index is set for different moving speeds. For example, when the moving speed is 0.1 km/h quasi-static, a correspondence among the MCS index, the RS sending period, and the DMRS type may be presented in a form of a table. That is, Table 18 presents the fifth correspondence. When the moving speed is 3 km/h, a correspondence among the MCS index, the RS sending period, and the DMRS type may be presented in a form of a table. That is, Table 19 presents the fifth correspondence.

TABLE 18

| MCS index & RS sending period | DMRS type | Modulation order & code rate (x/1024) |
|---|---|---|
| 0 ≤ $I_{MCS}$ ≤ 22 & RS sending period = {1, 5, 10} TTIs | type1 | Value corresponding to $I_{MCS}$ |
| 23 ≤ $I_{MCS}$ ≤ 28 & RS sending period = 10 TTIs | | |
| 23 ≤ $I_{MCS}$ ≤ 28 & RS sending period = {1, 5} TTIs | type2 | |
| 29 ≤ $I_{MCS}$ ≤ 31 & RS sending period = {10} TTIs | | |

TABLE 19

| MCS index & RS sending period | DMRS type | Modulation order & code rate (x/1024) |
|---|---|---|
| 0 ≤ $I_{MCS}$ ≤ 22 & RS sending period = {1, 5, 10, 20} TTIs | type1 | Value corresponding to $I_{MCS}$ |
| 23 ≤ $I_{MCS}$ ≤ 28 & RS sending period = 20 TTIs | | |
| 23 ≤ $I_{MCS}$ ≤ 28 & RS sending period = {1, 5, 10} TTIs | type2 | |
| 29 ≤ $I_{MCS}$ ≤ 31 & RS sending period = {10} TTIs | | |

During actual application, the fifth correspondence may be obtained through simulation based on a preset parameter. For example, simulation parameters include the DMRS type (for example, configured as type1 & type2), the DMRS additional position (for example, configured as pos1), Ideal CSI-RS estimation, Real DMRS estimation, and a TDL-C channel model.

When a channel condition is poorer (for example, an SNR is lower), a determined MCS index is smaller, and DMRSs of type1 are more densely distributed in frequency domain and can provide a better frequency diversity gain than DMRSs of type2. Therefore, a channel can be estimated more accurately and correct data demodulation and decoding are ensured, to implement better spectral efficiency. When the channel condition is better (for example, the SNR is higher), the determined MCS index is larger, and a DMRS of type2 can be used to reduce DMRS pilot overheads, to improve system spectral efficiency.

When a configured RS sending period is larger, denser DMRS configuration, namely, DMRSs of type1, can be allowed when pilot overheads are the same. When the configured RS sending period is smaller, a DMRS of type2 helps reduce pilot overheads.

In conclusion, when the MCS index is smaller and the RS sending period is larger, the DMRS of type1 may be configured; when the MCS index is larger and the RS sending period is smaller, only the DMRS of type2 can be configured. Therefore, a value of the DMRS type may be implicitly indicated by using the MCS index and the RS sending period.

For example, a correspondence among the MCS index, the RS sending period, and the DMRS type may be presented in a form of a table. That is, Table 20 presents the fifth correspondence.

TABLE 20

| DMRS-type for implementing higher spectral efficiency | Corresponding SNR and RS sending period |
|---|---|
| type1 | $0 \le I_{MCS} \le 22$, and RS sending period = {1, 5, 10, 20} TTIs |
|  | $23 \le I_{MCS} \le 28$, and RS sending period = 20 TTIs |
| type2 | $23 \le I_{MCS} \le 28$, and RS sending period = {1, 5, 10} TTIs |
|  | $29 \le I_{MCS} \le 31$, and RS sending period = 20 TTIs |

It can be learned from Table 20 that when $0 \le I_{MCS} \le 22$ and RS sending period={1, 5, 10, 20} TTIs, a value of the DMRS type is type1; when $23 \le I_{MCS} \le 28$ and RS sending period=20 TIs, a value of the DMRS type is type1; when $23 \le I_{MCS} \le 28$ and RS sending period={1, 5, 10}TTIs, a value of the DMRS type is type2; when $29 \le I_{MCS} \le 31$ and RS sending period=20 TTIs, a value of the DMRS type is type2.

In some other embodiments, the at least one parameter includes the DMRS additional position and the DMRS type. There is a sixth correspondence among the first MCS information, the RS sending period, the DMRS additional position, and the DMRS type. The terminal device may determine the DMRS additional position and the DMRS type based on the first MCS information, the RS sending period, and the sixth correspondence. The sixth correspondence includes a plurality of pieces of MCS information, a plurality of RS sending periods, values of the DMRS additional position, and values of the DMRS type. The sixth correspondence may be an overall correspondence among a plurality of MCS information ranges, the plurality of RS sending periods, the values of the DMRS additional position, and the values of the DMRS type. The terminal device may determine, by using the sixth correspondence, whether the plurality of pieces of MCS information in the sixth correspondence cover the first MCS information. If the plurality of pieces of MCS information cover the first MCS information, the terminal device determines whether the plurality of RS sending periods included in the sixth correspondence cover the first RS sending period. If the plurality of RS sending periods cover the first RS sending period, the terminal device obtains a value of the DMRS additional position and a value of the DMRS type that correspond to the first MCS information and the first RS sending period.

For example, it is assumed that the MCS information is an MCS index, and the values of the DMRS additional position include pos0, pos1, pos2, and pos3. The values of the DMRS type include type1 and type2. When maxlength is configured as single, a correspondence among the MCS index, the RS sending period, the DMRS additional position, and the DMRS type may be presented in a form of a table. That is, Table 21 presents the sixth correspondence.

TABLE 21

| MCS index | DMRS additional position | DMRS type | Modulation order & code rate (x/1024) |
|---|---|---|---|
| $h \le I_{MCS} < i$ | pos3 | type1 | Value corresponding to $I_{MCS}$ |
| $i \le I_{MCS} < j$ | pos2 |  |  |

TABLE 21-continued

| MCS index | DMRS additional position | DMRS type | Modulation order & code rate (x/1024) |
|---|---|---|---|
| $j \le I_{MCS} < k$ | pos1 |  |  |
| $k \le I_{MCS}$ | pos0 | type2 |  |

$I_{MCS}$ represents the MCS index. It can be learned from Table 21 that, when $h \le I_{MCS} < i$, a value of the DMRS additional position is pos3, and a value of the DMRS type is type1; when a $i \le I_{MCS} < j$, a value of the DMRS additional position is pos2, and a value of the DMRS type is type; when $j \le I_{MCS} < k$, a value of the DMRS additional position is pos1, and a value of the DMRS type is type1; when $k \le I_{MCS}$, a value of the DMRS additional position is pos0, and a value of the DMRS type is type2. j, i, j, and k are all non-negative integers. A value range is a value range 0 to 31 of an MCS index in an MCS table. For example, in Table 5.1.3.1-1, h=0, i=5, j=10, and k=17. A value of x1 may be five TTIs, 10 TTIs, or 20 TTIs. A value of x2 may be five TTIs or 10 TTIs. A value of x3 may be one TTI or five TTIs. A value of x4 may be one TTI or five TTIs.

It should be noted that the correspondence between the DMRS type and the DMRS additional position shown in Table 21 is merely an example for description, and values of the DMRS additional position corresponding to type2 may alternatively be a combination of pos1, pos2, pos3, and the like.

Optionally, the sixth correspondence may alternatively be an overall correspondence among a plurality of MCS information discrete values, values of the DMRS type, and values of the DMRS additional position. For example, when maxlength is configured as single, a correspondence among the MCS index, the RS sending period, the DMRS additional position, and the DMRS type may be presented in a form of a table. That is, Table 22 presents the sixth correspondence.

TABLE 22

| MCS index & RS sending period | DMRS additional position | DMRS type | Modulation order & code rate (x/1024) |
|---|---|---|---|
| $I_{MCS} \in \Lambda_7$ & x7 | pos3 | type1 | Value corresponding to $I_{MCS}$ |
| $I_{MCS} \in \Lambda_8$ & x8 | pos2 |  |  |

TABLE 22-continued

| MCS index & RS sending period | DMRS additional position | DMRS type | Modulation order & code rate (x/1024) |
|---|---|---|---|
| $I_{MCS} \in \Lambda_9$ & x9 | pos1 | | |
| $I_{MCS} \in \Lambda_{10}$ & x10 | pos1 | type2 | |
| $I_{MCS} \in \Lambda_{11}$ & x11 | pos0 | | |

When $I_{MCS} \in \Lambda_7$ & x7, a value of the DMRS additional position is pos3, and a value of the DMRS type is type1. When $I_{MCS} \in \Lambda_8$ & x8, a value of the DMRS additional position is pos2, and a value of the DMRS type is type1. When $I_{MCS} \in \Lambda_9$ & x9, a value of the DMRS additional position is pos1, and a value of the DMRS type is type1. When $I_{MCS} \in \Lambda_{10}$ & x10, a value of the DMRS additional position is pos1, and a value of the DMRS type is type2. When $I_{MCS} \in \Lambda_{11}$ & x11, a value of the DMRS additional position is pos0, and a value of the DMRS type is type2. $\Lambda_7$ $\Lambda_8$, $\Lambda_9$, $\Lambda_{10}$, and $\Lambda_{11}$ represent possible value sets of the MCS index. In addition, the value sets $\Lambda_7$, $\Lambda_8$, $\Lambda_9$, $\Lambda_{10}$, and $\Lambda_{11}$ are completely different. For example, a value of is {0, 1, 2, 3, 4}; a value of $\Lambda_8$ is {5, 6, 7, 8, 9}; a value of $\Lambda_9$ is {12, 13}; a value of $\Lambda_{10}$ is {10, 11, 14, 15, 16}; a value of $\Lambda_{11}$ is {17, . . . , 31}. A value of x7 may be five TTIs, 10 TTIs, or 20 TTIs. A value of x8 may be five TTIs or 10 TTIs. A value of x9 may be one TTI or five TTIs. A value of x10 may be one TTI or five TTIs. A value of x11 may be one TTI or five TTIs.

Further, the terminal device needs to first obtain the sixth correspondence before the terminal device determines the DMRS type and the DMRS additional position based on the first MCS information and the sixth correspondence. In a possible design, the sixth correspondence is predefined. In another possible design, the sixth correspondence is configured by using the higher layer signaling or configured by using the first signaling. Alternatively, index information of the sixth correspondence may be configured by using the higher layer signaling or the first signaling. For details, refer to the foregoing description of the first correspondence. Details are not described again.

It should be noted that the sixth correspondence is one of a plurality of correspondences. The plurality of correspondences may be correspondences set based on a plurality of moving scenarios. For example, the sixth correspondence is set based on a moving speed of the terminal device, and a value range of the MCS index is set for different moving speeds.

When a channel condition is poorer (for example, an SNR is lower), a determined MCS index is smaller. In addition, when the RS sending period is larger, more DMRSs are required to ensure accurate channel estimation and correct data demodulation and decoding. Therefore, the more additional DMRSs are configured and DMRSs of type1 that are denser in frequency domain are used. When the channel condition is better (for example, the SNR is higher), the determined MCS index is larger. In addition, when the RS sending period is smaller, only fewer DMRSs are required to accurately estimate a channel and correctly demodulate and decode data. Therefore, the fewer additional DMRSs are configured and DMRSs of type2 that are slightly sparse in frequency domain are used to effectively reduce pilot overheads of a reference signal and improve system spectral efficiency.

In conclusion, a value of the DMRS additional position and a value of the DMRS type may be implicitly indicated by using the MCS index and the RS sending period.

S305b: The network device determines the at least one parameter based on the first MCS information and the first RS sending period information.

For a specific explanation, refer to the description in S303b. Details are not described again.

According to the communication method provided in this embodiment of this application, a parameter used to determine a DMRS pattern may be (implicitly) indicated by using the MCS index and the RS sending period information. Compared with a manner of notifying, by using RRC signaling, the parameter for determining the DMRS pattern, the method can more flexibly configure the related parameter of the DMRS pattern, adapt to a change of an actual channel, and reduce some bit overheads. In addition, a DMRS is no longer configured in each TTI, to reduce overheads of a time-frequency resource of the DMRS, and improve system spectral efficiency.

It should be noted that a sequence of the steps in the communication method provided in this embodiment of this application may be properly adjusted, or the steps may be correspondingly added or deleted based on a situation. For example, a sequence of S501 and S301 may be exchanged. That is, S501 may be first performed, and then S301 is performed. Any method that can be easily figured out by a person skilled in the art within the technical scope disclosed in the present invention shall fall within the protection scope of this application. Therefore, details are not described again.

Figure 6:
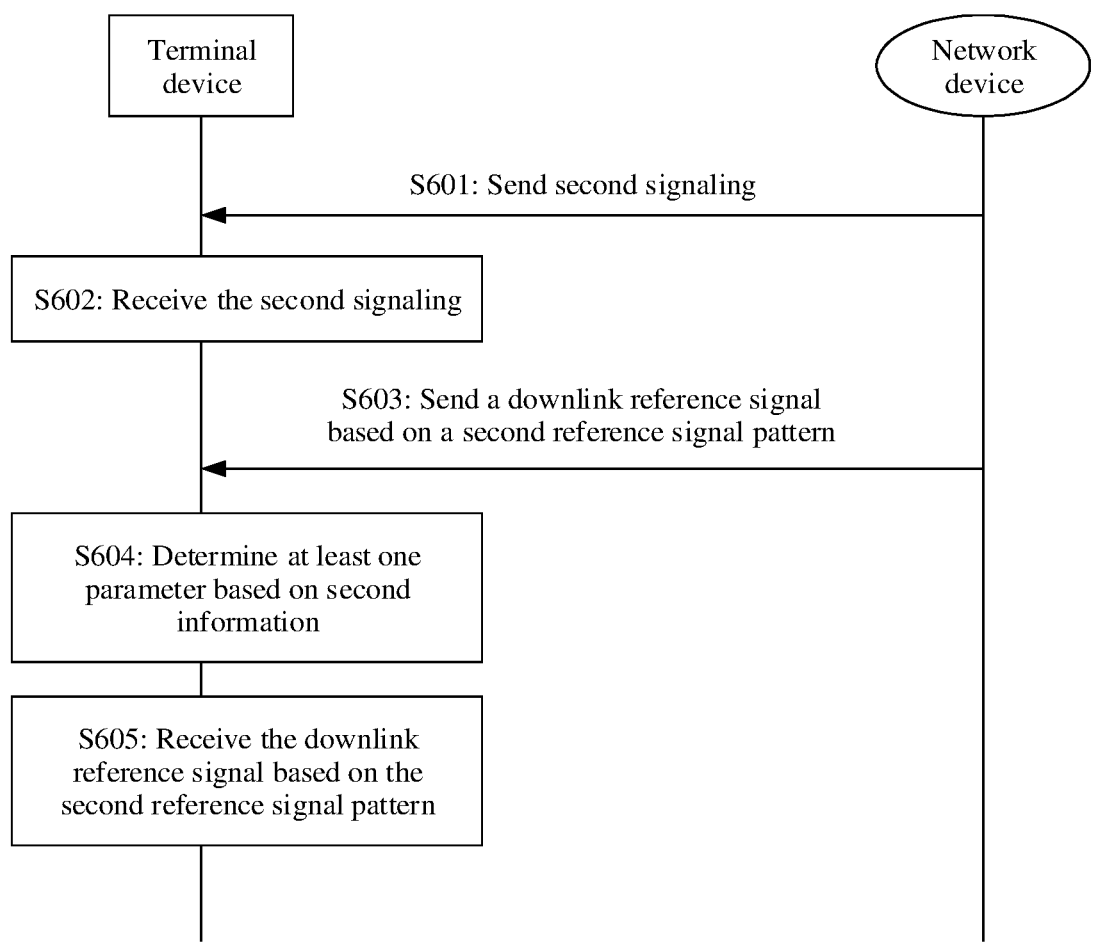
FIG. 6 is a flowchart of yet another communication method according to an embodiment of this application.

For downlink transmission, the network device may determine, based on channel quality of a PDSCH and interference information of a cell to which the terminal device currently belongs, a reference signal pattern used to send a downlink reference signal, and the terminal device may receive the downlink reference signal according to the communication method provided in this application. FIG. 6 is a flowchart of a communication method according to an embodiment of this application. As shown in FIG. 6, the method may include the following steps.

S601: A network device sends second signaling to a terminal device.

Specifically, after determining, based on channel quality of a PDSCH, a modulation order and a code rate that are used for downlink transmission, the network device may notify, by using the second signaling, the terminal device of an MCS index value corresponding to the modulation order and the code rate. The second signaling may be DCI. For example, the DCI includes an MCS index value field of a 5-bit length, and a bit status (namely, bit information) carried in the MCS index value field indicates an MCS index. The terminal device can flexibly use the MCS index indicated by the DCI, to adapt to downlink transmission channel quality.

It should be noted that for an MCS table for PDSCH downlink transmission, refer to tables Table 5.1.3.1-1, Table 5.1.3.1-2, and Table 5.1.3.1-3 in the protocol TS 38.214. For other specific explanations, refer to the description in S301. Details are not described again.

S602: The terminal device receives the second signaling sent by the network device.

The second signaling may be the DCI. For a specific explanation, refer to the description in S601. Details are not described again.

S603: The network device sends a downlink reference signal to the terminal device based on a second reference signal pattern.

The network device may determine the second reference signal pattern based on the channel quality of the PDSCH and interference information of a cell to which the terminal device currently belongs, and then send the downlink reference signal to the terminal device based on the second reference signal pattern. For a specific explanation, refer to a conventional technology. Details are not described again.

S604: The terminal device determines at least one parameter based on second information.

In a first design, the second information may be second MCS information such as a second MCS index. The terminal device may obtain the second MCS index by using the received second signaling. That is, the second signaling includes the second MCS index.

In a second design, the second information may include a second MCS index and second RS sending period information. The second RS sending period information may be a second RS sending period or an index of the second RS sending period. This is not limited in this application.

The at least one parameter is used to indicate the second reference signal pattern. The second reference signal pattern may be determined by using at least one of a DMRS additional position, a DMRS type, and a front-loaded DMRS time domain length. The at least one parameter may include at least one of the DMRS type and the DMRS additional position.

In a possible design, the at least one parameter includes a reference signal additional position. There is a seventh correspondence between the second MCS information and the reference signal additional position.

In another possible design, the at least one parameter includes a reference signal type. There is an eighth correspondence between the second MCS information and the reference signal type.

In another possible design, the at least one parameter includes a reference signal additional position and a reference signal type. There is a ninth correspondence among the first MCS information, the reference signal type, and the reference signal type.

In another possible design, the at least one parameter includes a reference signal additional position. There is a tenth correspondence among the second MCS information, second reference signal sending period information, and the reference signal additional position.

In another possible design, the at least one parameter includes a reference signal type. There is an eleventh correspondence among the second MCS information, second reference signal sending period information, and the reference signal type.

In another possible design, the at least one parameter includes a reference signal additional position and a reference signal type. There is a twelfth correspondence among the first MCS information, second reference signal sending period information, the reference signal type, and the reference signal type.

It should be noted that, similar to the first correspondence to the sixth correspondence in uplink transmission, a specific value range of the MCS index in the seventh correspondence to the twelfth correspondence in downlink transmission may be the same as that in the first correspondence to the sixth correspondence in uplink transmission, or may be adjusted based on downlink channel characteristics.

In this embodiment, the downlink reference signal may be a DMRS. In addition, for a specific implementation in which the terminal device determines the at least one parameter based on the second information, refer to the description in S303, S303a, and S303b. Details are not described again.

S605: The terminal device receives the downlink reference signal based on the second reference signal pattern.

According to the communication method provided in this embodiment of this application, a parameter used to determine a DMRS pattern is (implicitly) indicated by using MCS information or the MCS information and RS sending period information. Compared with a manner of notifying the parameter of the DMRS pattern by using RRC signaling, the method can more flexibly configure the related parameter of the DMRS pattern, adapt to a change of an actual channel, and reduce some bit overheads.

Optionally, the first MCS information in the foregoing embodiments may be replaced with a CQI.

In a time division multiplexing TDD system, an uplink reference signal and a downlink reference signal may be transmitted based on reciprocity between a downlink transmission channel and an uplink transmission channel. The reciprocity between the downlink transmission channel and the uplink transmission channel may be understood as that the downlink transmission channel and the uplink transmission channel are a same channel, and have a same characteristic such as channel quality and channel strength.

Figure 7:
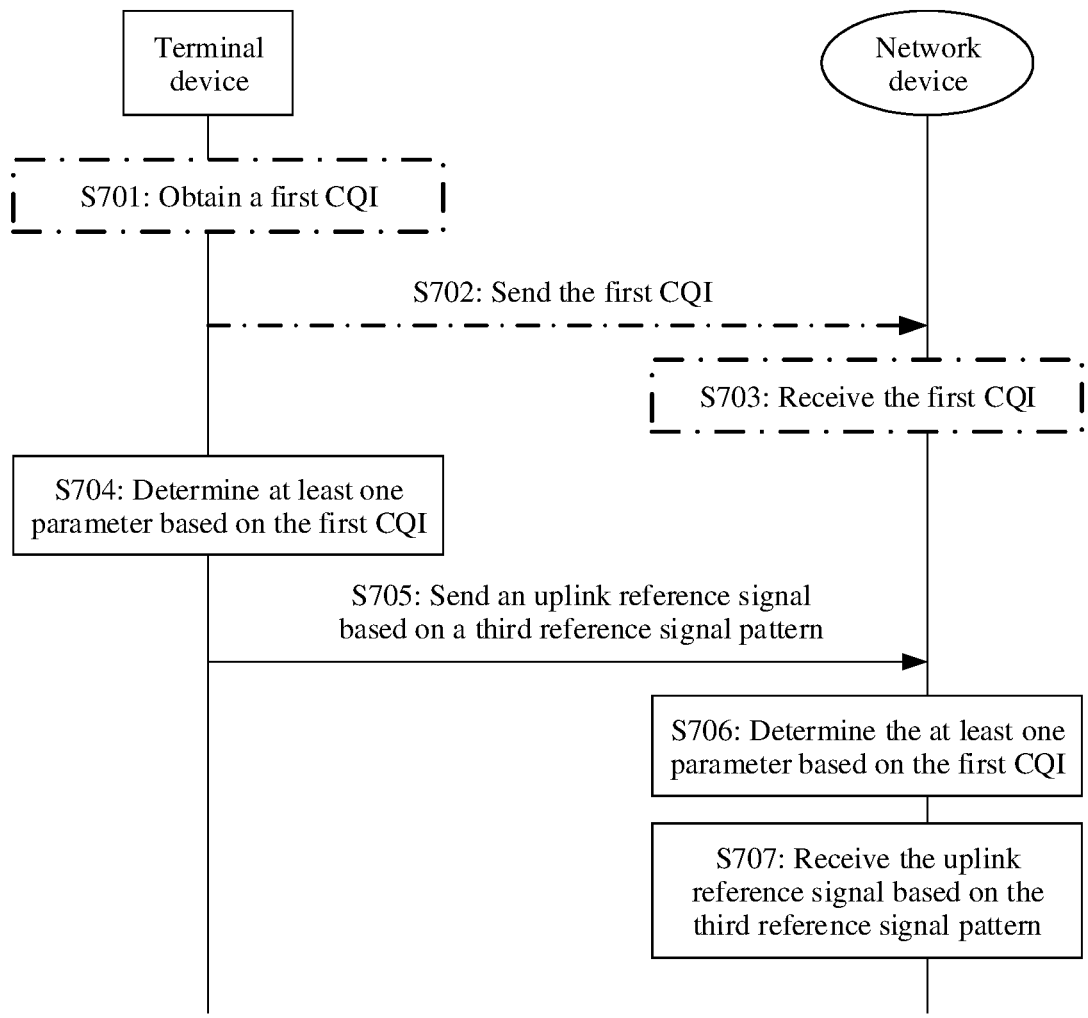
FIG. 7 is a flowchart of yet another communication method according to an embodiment of this application.

The following describes in detail an implementation of determining a reference signal pattern based on a CQI. FIG. 7 is a flowchart of a communication method according to an embodiment of this application. As shown in FIG. 7, the method may include the following steps.

S701: A terminal device obtains a first CQI.

In some embodiments, a network device configures a CSI-RS pilot in downlink transmission. After obtaining the downlink channel state information (CSI)-RS pilot, the terminal device may perform downlink channel measurement and estimation based on the CSI-RS pilot, to learn of at least one of the following information: a transmit rank indication, a precoding matrix indication (PMI), a CQI, a strongest layer indication (LI), a reference signal received power (RSRP), and the like.

In this embodiment, an example in which after obtaining the first CQI, the terminal device may send an uplink reference signal based on the first CQI is used for description. The first CQI may be obtained through estimation based on the downlink CSI-RS pilot.

S702: The terminal device sends the first CQI to the network device.

After obtaining an uplink transmission grant and triggering of CSI reporting, the terminal device notifies the network device of CSI and CQI information of a downlink channel through uplink transmission, where the CSI and the CQI information are used by the network device to receive the uplink reference signal and make a decision on downlink scheduling transmission.

S703: The network device receives the first CQI sent by the terminal device.

S704: The terminal device determines at least one parameter based on the first CQI.

Based on reciprocity between an uplink channel and the downlink channel, the terminal device may learn of uplink channel quality with reference to a downlink CQI. Therefore, the terminal device determines the at least one parameter based on the first CQI, where the at least one parameter is used to indicate a third reference signal pattern. The third reference signal pattern may be determined by using at least one of a DMRS additional position, a DMRS type, and a front-loaded DMRS time domain length. It may be understood that "determining the at least one parameter based on the CQI, where the at least one parameter is used to indicate the third reference signal pattern" may alternatively be expressed as "determining the third reference signal pattern based on the CQI, where the third reference signal pattern is indicated by using the at least one parameter".

In some embodiments, the at least one parameter includes the DMRS additional position. In some other embodiments, the at least one parameter includes the DMRS type. In some other embodiments, the at least one parameter includes the DMRS additional position and the DMRS type.

In a possible design, the at least one parameter includes a reference signal additional position. There is a thirteenth correspondence between the first CQI and the reference signal additional position.

In another possible design, the at least one parameter includes a reference signal type. There is a fourteenth correspondence between the first CQI and the reference signal type.

In another possible design, the at least one parameter includes a reference signal additional position and a reference signal type. There is a fifteenth correspondence among the first CQI, the reference signal type, and the reference signal type.

A difference between this embodiment and the foregoing embodiment lies in that the foregoing "first MCS information" is replaced with the CQI. Specifically, an index range of the CQI may be 0 to 15. For details, refer to Table 5.2.2.1-2, Table 5.2.2.1-3, and Table 5.2.2.1-4 in TS 38.214. A specific value range of the first CQI and a value of the DMRS additional position and/or the DMRS type in the thirteenth correspondence to the fifteenth correspondence may be set based on a characteristic of an uplink transmission channel. For specific method steps, refer to description in the foregoing related steps. Details are not described again.

S705: The terminal device sends the uplink reference signal based on the third reference signal pattern.

S706: The network device determines the at least one parameter based on the first CQI.

S707: The network device receives the uplink reference signal based on the third reference signal pattern.

For explanations of S705 to S707, refer to description in the foregoing related steps. Details are not described again.

According to the communication method provided in this embodiment of this application, a parameter used to determine a DMRS pattern may be (implicitly) indicated by using the CQI. Compared with a manner of notifying, by using RRC signaling, the parameter for determining the DMRS pattern, the method can more flexibly configure the related parameter of the DMRS pattern, adapt to a change of an actual channel, and reduce some bit overheads.

Similarly, for downlink transmission, based on reciprocity between the uplink channel and the downlink channel, the terminal device learns of downlink channel quality based on the downlink CQI. The terminal device determines the at least one parameter based on the first CQI, and receives a downlink reference signal based on a fourth reference signal pattern. When obtaining the first CQI, the network device may determine the at least one parameter based on the first CQI, and send the downlink reference signal based on the fourth reference signal pattern.

The at least one parameter is used to indicate the fourth reference signal pattern. The fourth reference signal pattern may be determined by using at least one of the DMRS additional position, the DMRS type, and the front-loaded DMRS time domain length. It may be understood that "determining the at least one parameter based on the CQI, where the at least one parameter is used to indicate the fourth reference signal pattern" may alternatively be expressed as "determining the fourth reference signal pattern based on the CQI, where the fourth reference signal pattern is indicated by using the at least one parameter".

In some embodiments, the at least one parameter includes the DMRS additional position. In some other embodiments, the at least one parameter includes the DMRS type. In some other embodiments, the at least one parameter includes the DMRS additional position and the DMRS type.

In a possible design, the at least one parameter includes a reference signal additional position. There is a sixteenth correspondence between the first CQI and the reference signal additional position.

In another possible design, the at least one parameter includes a reference signal type. There is a seventeenth correspondence between the first CQI and the reference signal type.

In another possible design, the at least one parameter includes a reference signal additional position and a reference signal type. There is an eighteenth correspondence among the first CQI, the reference signal type, and the reference signal type.

A difference between this embodiment and the foregoing embodiment lies in that the foregoing "first MCS information" is replaced with the CQI. In addition, an index range of the CQI is 0 to 15. For details, refer to Table 5.2.2.1-2, Table 5.2.2.1-3, and Table 5.2.2.1-4 in TS 38.214. A specific value range of the first CQI and a value of the DMRS additional position and/or the DMRS type in the sixteenth correspondence to the eighteenth correspondence may be set based on a characteristic of a downlink transmission channel. For specific method steps, refer to description in the foregoing related steps. Details are not described again.

In the foregoing embodiments provided in this application, the methods provided in the embodiments of this application are separately described from perspectives of the network device, the terminal device, and interaction between the network device and the terminal device. It may be understood that, to implement the functions in the methods provided in the foregoing embodiments of this application, each network element such as the network device or the terminal device includes a corresponding hardware structure and/or software module for performing the functions. A person skilled in the art should be easily aware that, in combination with the examples described in the embodiments disclosed in this specification, algorithms and steps can be implemented by hardware or a combination of hardware and computer software in this application. Whether a function is performed by using hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the network device and the terminal device may be divided into function modules based on the foregoing method examples. For example, function modules may be obtained through division based on corresponding functions, or two or more functions may be integrated into one processing module. The integrated module may be implemented in a form of hardware, or may be implemented in a form of a software functional module. It should be noted that, in the embodiments of this application, division into the modules is an example, and is merely logical function division. During actual implementation, another division manner may be used.

Figure 8:
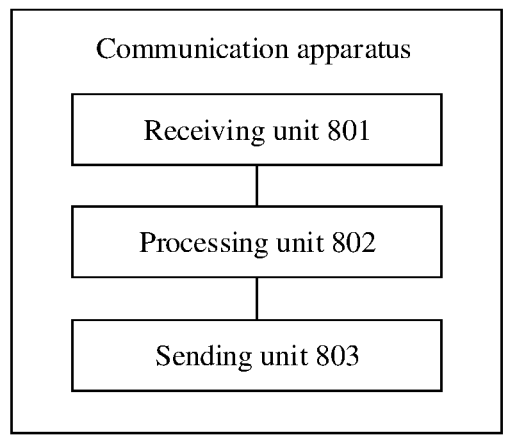
FIG. 8 is a schematic composition diagram of a communication apparatus according to an embodiment of this application.

When function modules are obtained through division based on corresponding functions, FIG. 8 is a possible schematic composition diagram of the communication apparatus in the foregoing embodiments. The communication apparatus can perform steps performed by the network device or the terminal device in any one of the method embodiments of this application. The communication apparatus may include a receiving unit 801, a processing unit 802, and a sending unit 803.

When the communication apparatus is a terminal device or a communication apparatus that supports the terminal device in implementing the methods provided in the embodiments. For example, the communication apparatus may be a chip system.

The receiving unit 801 is configured to support the communication apparatus in performing the methods described in the embodiments of this application. For example, the receiving unit 801 is configured to perform or support the communication apparatus in performing S302 in the communication method shown in FIG. 3, S302 in the communication method shown in FIG. 4, S302 and S502 in the communication method shown in FIG. 5, and S602 in the communication method shown in FIG. 6.

The processing unit 802 is configured to perform or support the communication apparatus in performing S303 in the communication method shown in FIG. 3, S303a in the communication method shown in FIG. 4, S303b in the communication method shown in FIG. 5, S604 in the communication method shown in FIG. 6, and S704 in the communication method shown in FIG. 7.

The sending unit 803 is configured to perform or support the communication apparatus in performing S304 in the communication method shown in FIG. 3, S304 in the communication method shown in FIG. 4, S304 in the communication method shown in FIG. 5, and S702 and S705 in the communication method shown in FIG. 7.

When the communication apparatus is a network device or a communication apparatus that supports the network device in implementing the methods provided in the embodiments. For example, the communication apparatus may be a chip system.

The receiving unit 801 is configured to support the communication apparatus in performing the methods described in the embodiments of this application. For example, the receiving unit 801 is configured to perform or support the communication apparatus in performing S306 in the communication method shown in FIG. 3, S306 in the communication method shown in FIG. 4, S306 in the communication method shown in FIG. 5, and S707 in the communication method shown in FIG. 7.

The processing unit 802 is configured to perform or support the communication apparatus in performing S305 in the communication method shown in FIG. 3, S305a in the communication method shown in FIG. 4, S305b in the communication method shown in FIG. 5, and S706 in the communication method shown in FIG. 7.

The sending unit 803 is configured to perform or support the communication apparatus in performing S301 in the communication method shown in FIG. 3, S301 in the communication method shown in FIG. 4, S301 and S501 in the communication method shown in FIG. 5, and S601 and S603 in the communication method shown in FIG. 6.

It should be noted that all related content of the steps in the foregoing method embodiments may be cited in function description of corresponding function modules. Details are not described herein again.

The communication apparatus provided in this embodiment of this application is configured to perform the method in any one of the foregoing embodiments, and therefore a same effect can be achieved as that of the methods in the foregoing embodiments.

Figure 9:
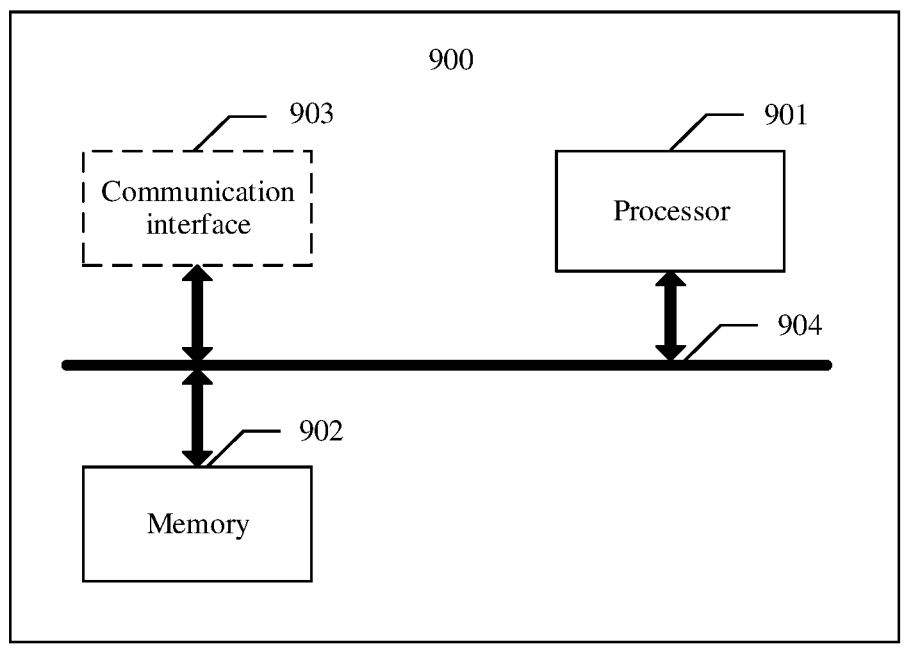
FIG. 9 is a schematic composition diagram of another communication apparatus according to an embodiment of this application.

FIG. 9 shows a communication apparatus 900 according to an embodiment of this application. The communication apparatus 900 is configured to implement functions of the network device in the foregoing methods. The communication apparatus 900 may be a network device, or may be an apparatus in the network device. The communication apparatus 900 may be a chip system. In this embodiment of this application, the chip system may include a chip, or may include a chip and another discrete component. Alternatively, the communication apparatus 900 is configured to implement functions of the terminal device in the foregoing methods. The communication apparatus 900 may be the terminal device, or may be an apparatus in the terminal device. The communication apparatus 900 may be a chip system. In this embodiment of this application, the chip system may include a chip, or may include a chip and another discrete component.

The communication apparatus 900 includes at least one processor 901, configured to implement functions of the network device or the terminal device in the methods provided in the embodiments of this application. For example, the processor 901 may be configured to determine at least one parameter based on first MCS information, determine the at least one parameter based on the first MCS information and first RS sending period information, determine the at least one parameter based on a first CQI, or the like. For details, refer to detailed description in the method examples. Details are not described herein.

The communication apparatus 900 may further include at least one memory 902, configured to store program instructions and/or data. The memory 902 is coupled to the processor 901. Coupling in this embodiment of this application may be indirect coupling or a communication connection between apparatuses, units, or modules in an electrical form, a mechanical form, or another form, and is used for information exchange between the apparatuses, the units, or the modules. The processor 901 may operate with the memory 902. The processor 901 may execute the program instructions stored in the memory 902. At least one of the at least one memory may be included in the processor.

The communication apparatus 900 may further include a communication interface 903, configured to communicate with another device through a transmission medium, so that an apparatus in the communication apparatus 900 can communicate with the another device. For example, if the communication apparatus is a network device, the another device is a terminal device. If the communication apparatus is a terminal device, the another device is a network device. The processor 901 sends and receives data by using the communication interface 903, and is configured to implement the methods performed by the network device or the terminal device in the embodiments corresponding to FIG. 3 to FIG. 7.

In this embodiment of this application, a specific connection medium between the communication interface 903, the processor 901, and the memory 902 is not limited. In this embodiment of this application, in FIG. 9, the communication interface 903, the processor 901, and the memory 902 are connected through a bus 904. The bus is represented by using a thick line in FIG. 9. A connection manner between other components is merely an example for description, and constitutes no limitation. The bus may be classified into an address bus, a data bus, a control bus, and the like. For ease of representation, only one thick line is used to represent the bus in FIG. 9, but this does not mean that there is only one bus or only one type of bus.

In the embodiments of this application, the processor may be a general purpose processor, a digital signal processor, an application-specific integrated circuit, a field programmable gate array or another programmable logic device, a discrete gate or a transistor logic device, or a discrete hardware component, and may implement or perform the methods, steps, and logical block diagrams disclosed in the embodiments of this application. The general purpose processor may be a microprocessor or any conventional processor or the like. The steps of the methods disclosed with reference to the embodiments of this application may be directly performed and accomplished by using a hardware processor, or may be performed and accomplished by using a combination of hardware and software modules in the processor.

In the embodiments of this application, the memory may be a nonvolatile memory such as a hard disk drive (HDD) or a solid-state drive (SSD), or may be a volatile memory such as a random-access memory (RAM). The memory is any other medium that can be used to carry or store expected program code in a form of instructions or a data structure and that can be accessed by a computer. However, this is not limited thereto. The memory in the embodiments of this application may alternatively be a circuit or any other apparatus that can implement a storage function, and is configured to store program instructions and/or data. The terminal device in the embodiments of this application may be the smartphone. The network device in the embodiments of this application may be a base station.

By using the foregoing description of the implementations, a person skilled in the art may clearly understand that, for the purpose of convenient and brief description, only division into the foregoing function modules is used as an example for description. During actual application, the foregoing functions may be allocated to different function modules and implemented based on a requirement. That is, an inner structure of an apparatus is divided into different function modules to implement all or some of the functions described above.

In the several embodiments provided in this application, it should be understood that the disclosed apparatus and method may be implemented in other manners. For example, the foregoing apparatus embodiment is merely an example. For example, division into the modules or units is merely logical function division and may be other division during actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may be one or more physical units, may be located in one place, or may be distributed on different places. Some or all of the units may be selected based on an actual requirement to achieve the objectives of the solutions in the embodiments.

In addition, functional units in the embodiments of this application may be integrated into one processing unit, each of the units may exist alone physically, or two or more units are integrated into one unit. The integrated unit may be implemented in a form of hardware, or may be implemented in a form of a software function unit.

All or some of the foregoing methods provided in the embodiments of this application may be implemented by using software, hardware, firmware, or any combination thereof. When the software is used to implement the embodiments, the embodiments may be implemented completely or partially in a form of a computer program product. The computer program product includes one or more computer instructions. When the computer program instructions are loaded and executed on a computer, the procedure or functions according to the embodiments of the present invention are completely or partially generated. The computer may be a general-purpose computer, a dedicated computer, a computer network, a network device, a terminal device, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium that can be accessed by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, an SSD), or the like.

The foregoing description is merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A communication method, comprising:
   receiving, by a terminal device, first signaling, wherein the first signaling comprises first modulation and coding scheme (MCS) information;
   determining, by the terminal device, at least one parameter based on the first MCS information, wherein the at least one parameter indicates a first reference signal pattern, and the at least one parameter comprises a reference signal additional position, the reference signal additional position determined based on a correspondence between the first MCS information, reference signal sending period information, and the reference signal additional position; and
   sending, by the terminal device, an uplink reference signal based on the first reference signal pattern.

2. The method according to claim 1, wherein determining, by the terminal device, the at least one parameter based on the first MCS information comprises:

determining, by the terminal device, the at least one parameter based on the first MCS information and the reference signal sending period information.

3. The method according to claim 1, wherein the correspondence is a fourth correspondence that is predefined, or the fourth correspondence is configured using higher layer signaling, or the fourth correspondence is configured using downlink control information.

4. The method according to claim 1, wherein the at least one parameter further comprises a reference signal type.

5. A communication method, comprising:
sending, by a network device, first signaling, wherein the first signaling comprises first modulation and coding scheme (MCS) information;
determining, by the network device, at least one parameter based on the first MCS information, wherein the at least one parameter indicates a first reference signal pattern, and the at least one parameter comprises a reference signal additional position, the reference signal additional position determined based on a correspondence between the first MCS information, reference signal sending period information, and the reference signal additional position; and
receiving, by the network device, an uplink reference signal based on the first reference signal pattern.

6. The method according to claim 5, wherein determining, by the network device, the at least one parameter based on the first MCS information comprises:
determining, by the network device, the at least one parameter based on the first MCS information and the reference signal sending period information.

7. The method according to claim 5, wherein the correspondence is a fourth correspondence that is predefined, or the fourth correspondence is configured using higher layer signaling or the fourth correspondence is configured using downlink control information.

8. A communications apparatus, comprising:
one or more processors, and
at least one non-transitory memory configured to store program instructions;
wherein, when executed by the one or more processors, the program instructions cause the communications apparatus to:
receive first signaling, wherein the first signaling comprises first modulation and coding scheme (MCS) information;
determine at least one parameter based on the first MCS information, wherein the at least one parameter indicates a first reference signal pattern, and the at least one parameter comprises a reference signal additional position, the reference signal additional position determined based on a correspondence between the first MCS information, reference signal sending period information, and the reference signal additional position; and
send an uplink reference signal based on the first reference signal pattern.

9. The apparatus according to claim 8, wherein determining the at least one parameter based on the first MCS information comprises:
determining the at least one parameter based on the first MCS information and the reference signal sending period information.

10. The apparatus according to claim 8, wherein the correspondence is a fourth correspondence that is predefined, or the fourth correspondence is configured by using higher layer signaling, or the fourth correspondence is configured by using downlink control information.

11. A communications apparatus, comprising:
one or more processors, and
at least one non-transitory memory configured to store program instructions;
wherein, when executed by the one or more processors, the program instructions cause the communications apparatus to:
send first signaling, wherein the first signaling comprises first modulation and coding scheme (MCS) information;
determine at least one parameter based on the first MCS information, wherein the at least one parameter indicates a first reference signal pattern, and the at least one parameter comprises a reference signal additional position, the reference signal additional position determined based on a correspondence between the first MCS information, reference signal sending period information, and the reference signal additional position; and
receive an uplink reference signal based on the first reference signal pattern.

12. The apparatus according to claim 11, wherein determining the at least one parameter based on the first MCS information comprises:
determining the at least one parameter based on the first MCS information and the reference signal sending period information.

13. The apparatus according to claim 11, wherein the correspondence is a fourth correspondence that is predefined, or the fourth correspondence is configured using higher layer signaling, or the fourth correspondence is configured using downlink control information.

14. The method according to claim 1, wherein the correspondence is further based on a moving speed associated with the terminal device.

15. The method according to claim 1, wherein the first signaling comprises downlink control information (DCI) comprising the first MCS information.

* * * * *